US012703209B2

(12) United States Patent
Luo

(10) Patent No.: US 12,703,209 B2
(45) **Date of Patent: *Aug. 11, 2026**

(54) VEHICLE MONITORING SYSTEM

(71) Applicant: SHENZHEN BAOSHIJIE TECHNOLOGY CO., LTD., Shenzhen (CN)

(72) Inventor: Mingcai Luo, Shenzhen (CN)

(73) Assignee: SHENZHEN BAOSHIJIE TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/034,495

(22) Filed: Jan. 22, 2025

(65) Prior Publication Data

US 2025/0236140 A1 Jul. 24, 2025

(30) Foreign Application Priority Data

Jan. 22, 2024 (CN) ........................ 202420148050.3

(51) Int. Cl.
*B60C 23/04* (2006.01)
*G06F 3/0482* (2013.01)
(Continued)

(52) U.S. Cl.
CPC ...... *B60C 23/0479* (2013.01); *B60C 23/0401* (2013.01); *B60C 23/0483* (2013.01);
(Continued)

(58) Field of Classification Search
CPC .... B60R 2001/1253; B60R 2001/1215; B60R 1/04; B60R 2001/1223; B60R 11/04;
(Continued)

(56) References Cited

U.S. PATENT DOCUMENTS

2005/0040939 A1* 2/2005 Jobes ...................... B60Q 1/22 348/E7.086
2016/0075193 A1* 3/2016 Huang ................ B60C 23/0433 340/447

(Continued)

FOREIGN PATENT DOCUMENTS

CN 201169195 Y * 12/2008 ......... B60C 23/0401
CN 206426765 U * 8/2017
CN 105501006 B * 9/2017

*Primary Examiner* — Weiming He
(74) *Attorney, Agent, or Firm* — Cooper Legal Group, LLC

(57) ABSTRACT

A vehicle-mounted monitoring device includes a main body detachably arranged on a vehicle, and the main body is arranged with a circuit board, a display screen, a first communication module and a second communication module, and the display screen, the first communication module and the second communication module are all electrically connected to the circuit board. The first communication module is configured to receive image data wirelessly transmitted from at least one camera and then transmit the image data to the circuit board, the second communication module is configured to receive tire pressure data wirelessly transmitted from at least one tire pressure sensor and then transmit the tire pressure data to the circuit board, and the circuit board transmits both the image data and tire pressure data to the display screen for display.

17 Claims, 19 Drawing Sheets

(51) Int. Cl.
*G06F 3/04886* (2022.01)
*G06T 11/00* (2006.01)
*G07C 5/08* (2006.01)
*H04N 7/025* (2006.01)
*H04N 7/18* (2006.01)
*H04N 23/90* (2023.01)
*G08B 21/18* (2006.01)

(52) U.S. Cl.
CPC ........ *G06F 3/0482* (2013.01); *G06F 3/04886* (2013.01); *G06T 11/00* (2013.01); *G07C 5/0825* (2013.01); *H04N 7/0255* (2013.01); *H04N 7/181* (2013.01); *H04N 23/90* (2023.01); *G06F 2203/04803* (2013.01); *G06T 2210/62* (2013.01); *G08B 21/182* (2013.01)

(58) Field of Classification Search
CPC ............ B60R 2022/4866; H04N 23/90; H04N 7/0255; H04N 21/4882; G06F 3/04842; G06F 3/04886; G06F 3/0482; B60C 23/0479; G06T 2207/30268; G06T 11/00
See application file for complete search history.

(56) References Cited

U.S. PATENT DOCUMENTS

2019/0009786 A1* 1/2019 Liu ....................... B60W 40/08
2024/0140146 A1* 5/2024 Yang ................... B60C 23/0471
2024/0156547 A1* 5/2024 Luengo Muntion ... G06V 20/41

* cited by examiner

VEHICLE MONITORING SYSTEM

CROSS-REFERENCE TO RELATED APPLICATIONS

The present invention claims priority of Chinese patent application CN202420148050.3, filed on Jan. 22, 2024, which is incorporated herein by reference in its entireties.

TECHNICAL FIELD

The present invention relates to the technical field of vehicle-mounted monitoring, particularly to a vehicle-mounted monitoring system.

BACKGROUND

Current existing tire pressure monitors generally include a tire pressure monitoring device with a small display screen placed on a console in the car and a tire pressure sensors installed on tires. The tire pressure sensors wirelessly connect to the tire pressure monitor, enabling the transmission of detected tire pressure data to a display screen for user monitoring. Additionally, for convenient monitoring of vehicle's surroundings, multiple cameras are typically installed around the vehicle, and a monitoring host with a display screen is provided inside the vehicle, the monitoring host receives image data collected by cameras and displays the image data on the screen. Consequently, multiple display screens are placed in the vehicle, occupying space and potentially affecting driving safety as the driver must view corresponding information on different devices.

SUMMARY

The primary objective of the present invention is to provide a vehicle-mounted monitoring system to address the issue of safety impact due to multiple display screens caused by separate operation of existing tire pressure monitors and image monitoring systems.

The technical solution adopted by the present invention to solve the technical problem is as follows.

The present invention provides a vehicle-mounted monitoring system. The vehicle-mounted monitoring system includes at least one camera for monitoring, at least one tire pressure sensor for detecting tire pressure data and a vehicle-mounted monitoring device detachably arranged on the vehicle. The vehicle-mounted monitoring device is provided with a circuit board, a display screen, a first communication module and a second communication module, and the display screen, the first communication module and the second communication module are all electrically connected to the circuit board. The first communication module wirelessly communicates with the cameras and is configured to receive an image data wirelessly transmitted by each camera and then transmit the image data to the circuit board, and the second communication module wirelessly communicates with the tire pressure sensors and is configured to receive the tire pressure data wirelessly transmitted by each tire pressure sensor in real time and then transmit the tire pressure data to the circuit board; the circuit board is configured to transmit the image data and the tire pressure data to the display screen and display them simultaneously.

Furthermore, the display screen is divided into multiple display areas under the drive of the circuit board; at least one of the display areas is configured to display the image data, and at least one of the display areas is configured to display the tire pressure data.

Furthermore, the display screen is configured to display the image data and also display the tire pressure data superimposed on the image data simultaneously.

Furthermore, the number of the tire pressure sensors is multiple, the display screen is configured to display the image data and also to display one of the tire pressure data superimposed on the image data; the display screen is also configured to change to display the tire pressure data collected by another tire pressure sensor at intervals of a first preset time.

Furthermore, the display screen directly displays an abnormal tire pressure data when the tire pressure data is abnormal, and the display screen displays a tire pressure alarm indication when the tire pressure data is abnormal; the abnormality in the tire pressure data being one or more of the following: the tire pressure is higher than a first preset value, tire temperature is higher than a preset temperature, the tire pressure is lower than a second preset value, the tire pressure drops by a third preset value within a second preset time, the tire pressure drops by a fourth preset value within a third preset time, and the tire pressure sensor signal is lost.

Furthermore, when there are multiple abnormal tire pressure data, the display screen displays one of the multiple abnormal tire pressure data in rotation at the first preset time interval based on an entry time of the abnormal tire pressure data.

Furthermore, the tire pressure alarm indication is one or more of the following: a tire pressure alarm icon, a real-time tire imagery, and an abnormal tire virtual imagery; the real-time tire imagery is the real-time image of the abnormal tire captured by the camera, and the abnormal tire virtual imagery includes virtual image data pre-stored in the circuit board; the virtual image data includes dynamic imagery data for excessively high tire pressure, excessively low tire pressure, and tire turning red, or a combination thereof.

Furthermore, further includes an alarm unit arranged in a main body and electrically connected to the circuit board, the circuit board driving the alarm unit to alert when the tire pressure data is abnormal; the alarm unit being one or more of a horn, a buzzer, or an alarm light.

Furthermore, the circuit board drives the alarm unit to emit a tire blowout sound and drives the display screen to display a tire blowout image or a tire blowout indicator when the tire pressure changes from a normal pressure value to below the third preset value within a preset time period, the tire blowout image is either the real-time image of the tire captured by the camera or a virtual dynamic image of the tire blowout.

Furthermore, the circuit board displays a simulated vehicle model image through the display screen; the simulated vehicle model image includes a vehicle shape icon, and the vehicle shape icon includes a vehicle body icon and multiple first tire icons located on or beside the vehicle body icon; Each of the first tire icons corresponds to one of the tire pressure sensors, and a position of each first tire icon on the vehicle body icon corresponds to a position of a motor vehicle tire on the motor vehicle; the first tire icon flashes or is displayed differently from other first tire icons when the display screen displays the tire pressure data collected by a corresponding tire pressure sensor, and the tire pressure data is located on the vehicle shape icon or beside the vehicle shape icon.

Furthermore, the tire pressure data includes one or more of the following: tire pressure, tire temperature and battery power information of the tire pressure sensor; the circuit board transmits the tire air pressure and tire temperature to the display screen to be displayed, and the display screen turns color of the first tire icon corresponding to the tire pressure data to red when the tire pressure data is abnormal.

Furthermore, the display screen is a touch display screen; the display screen displays a tire pressure management menu interface when it is based on the simulated vehicle model image on the touch display screen; the tire pressure management menu interface includes an enlarged simulated vehicle model image; in the tire pressure management menu interface, at least one of the tire air pressure and the tire temperature is displayed on the first tire icon or beside the first tire icon corresponding to the tire pressure sensor.

Furthermore, in the tire pressure management menu interface, the display screen displays a tire pressure setting interface corresponding to the first tire icon when the user touches the first tire icon; the tire pressure setting interface includes a high-pressure alarm value, a low-pressure alarm value, a temperature alarm value and a keyboard; when the user touches one of the high-pressure alarm value, the low-pressure alarm value and the temperature alarm value, the display screen allows the user to set the corresponding high-pressure alarm value, low-pressure alarm value and temperature alarm value through the characters on the touch keyboard.

Furthermore, the tire pressure setting interface further includes a pairing unit, and the pairing unit includes automatic pairing and manual pairing; the display screen automatically pairs and communicates the second communication module with the tire pressure sensor when the user touches the automatic pairing and at the same time the tire pressure sensor is assembled onto a tire; the display screen pairs the tire pressure sensor with the second communication module when the user touches the manual pairing and inputs the corresponding tire pressure sensor pairing code through the touch keyboard.

Furthermore, the simulated vehicle model image further includes a carriage icon; the carriage icon includes a carriage body icon and a second tire icon located on the carriage body icon or beside the carriage body icon; the carriage body icon is positioned behind the vehicle body icon; each the second tire icon is used in correspondence with a tire pressure sensor, and a position of each second tire icon on the carriage body icon corresponds to a position of the motor vehicle tire on the motor vehicle carriage; at least one first tire icon is distributed at one end of the vehicle body icon adjacent to the carriage icon, and/or at least one second tire icon is distributed at one end of the carriage icon away from the vehicle body icon.

Furthermore, the number of the carriage icons is multiple, and each of the carriage icons is configured corresponding to a carriage of a motor vehicle respectively; the tire pressure management menu interface further includes multiple carriage touch indicators, and each of the multiple carriage touch indicators is configured corresponding to a carriage icon respectively; the display screen also starts or stops using the corresponding carriage icon when the user touches the carriage touch indicator.

Furthermore, in the tire pressure management menu interface, one of the carriage icons is displayed; the tire pressure management menu interface further includes a switching indicator, and the switching indicator is located on or beside the carriage icon; the switching indicator is configured to display the carriage touch indicator corresponding to the current carriage icon; the display screen switches to display another carriage icon when the user touches the switching indicator.

Furthermore, in the interface where the tire pressure data and the image data are displayed simultaneously, the display screen displays the corresponding carriage touch indicator on the carriage icon or beside the carriage icon.

Furthermore, in the interface where the tire pressure data and the image data are displayed simultaneously, the display screen adjusts a transparency of the tire pressure data by the user's touch on displaying a transparency percentage.

Furthermore, the display screen also enables the overlay of tire pressure data on the image or turns off the overlay of tire pressure data on the image by means of the user's touch on an ON/OFF switch.

Beneficial effects of the present invention are as follows. The present invention has the following beneficial effects. Compared with the prior art, in the present invention, by providing the first communication module and the second communication module in the vehicle-mounted monitoring device to receive image signals transmitted from the camera and tire pressure data transmitted from the tire pressure sensor, to achieve reduction of excessive issues with the display screen, thereby simplifying the vehicle interior, improving the driver's field of vision, obviating the necessity of monitoring multiple display screens, enhancing driving focus, and increasing road safety.

BRIEF DESCRIPTION OF THE DRAWINGS

In order to explain the technical solutions of the embodiments of the present invention more clearly, the following will briefly introduce the accompanying drawings used in the embodiments. The drawings in the following description are only some embodiments of the present invention. Those of ordinary skill in the art can obtain other drawings based on these drawings without creative work.

DETAILED DESCRIPTION OF THE EMBODIMENTS

Figure 1:
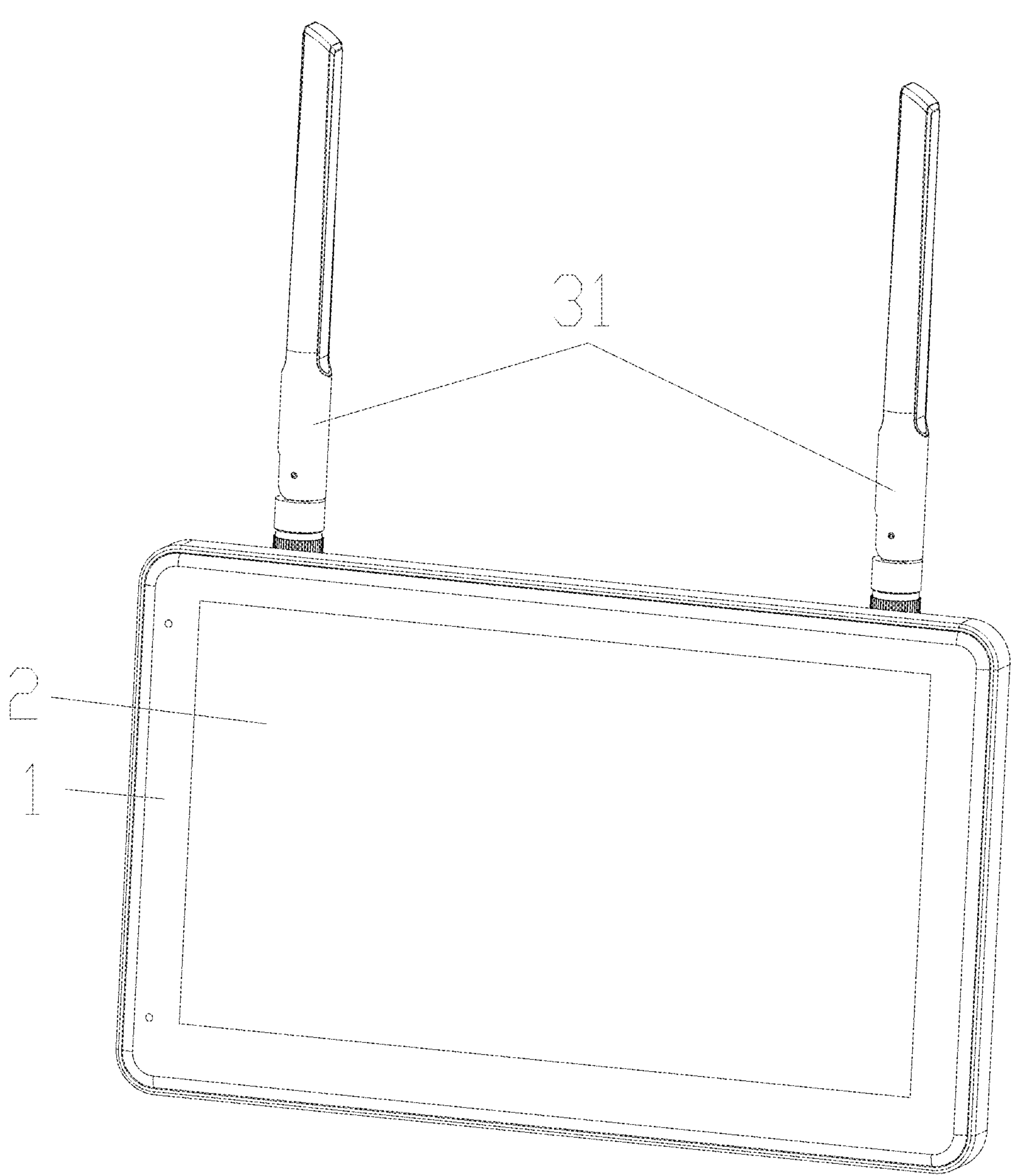
FIG. 1 is a three-dimensional view of a vehicle-mounted monitoring device of the present invention.
Figure 2:
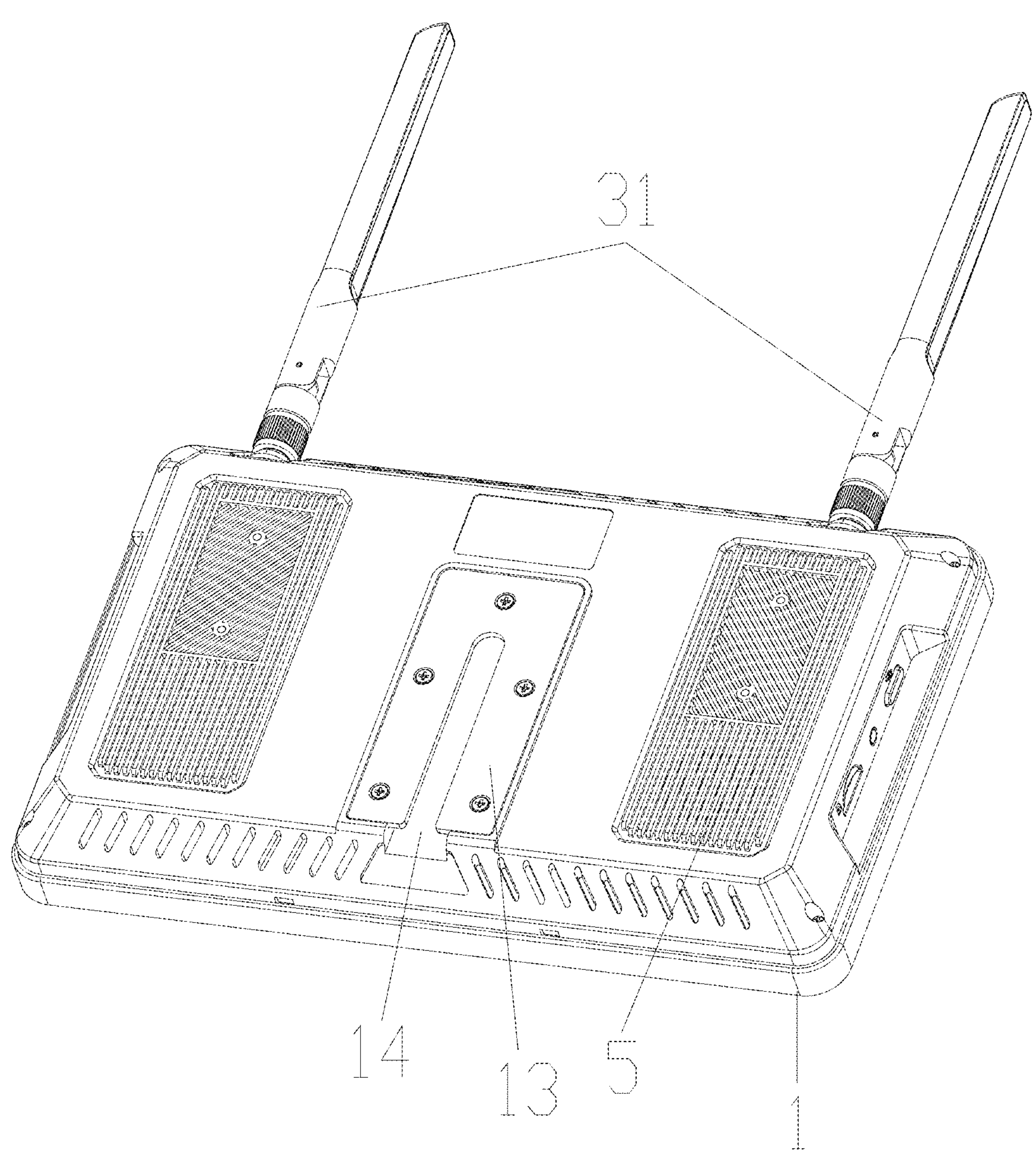
FIG. 2 is a three-dimensional view of the vehicle-mounted monitoring device of the present invention from another perspective.
Figure 3:
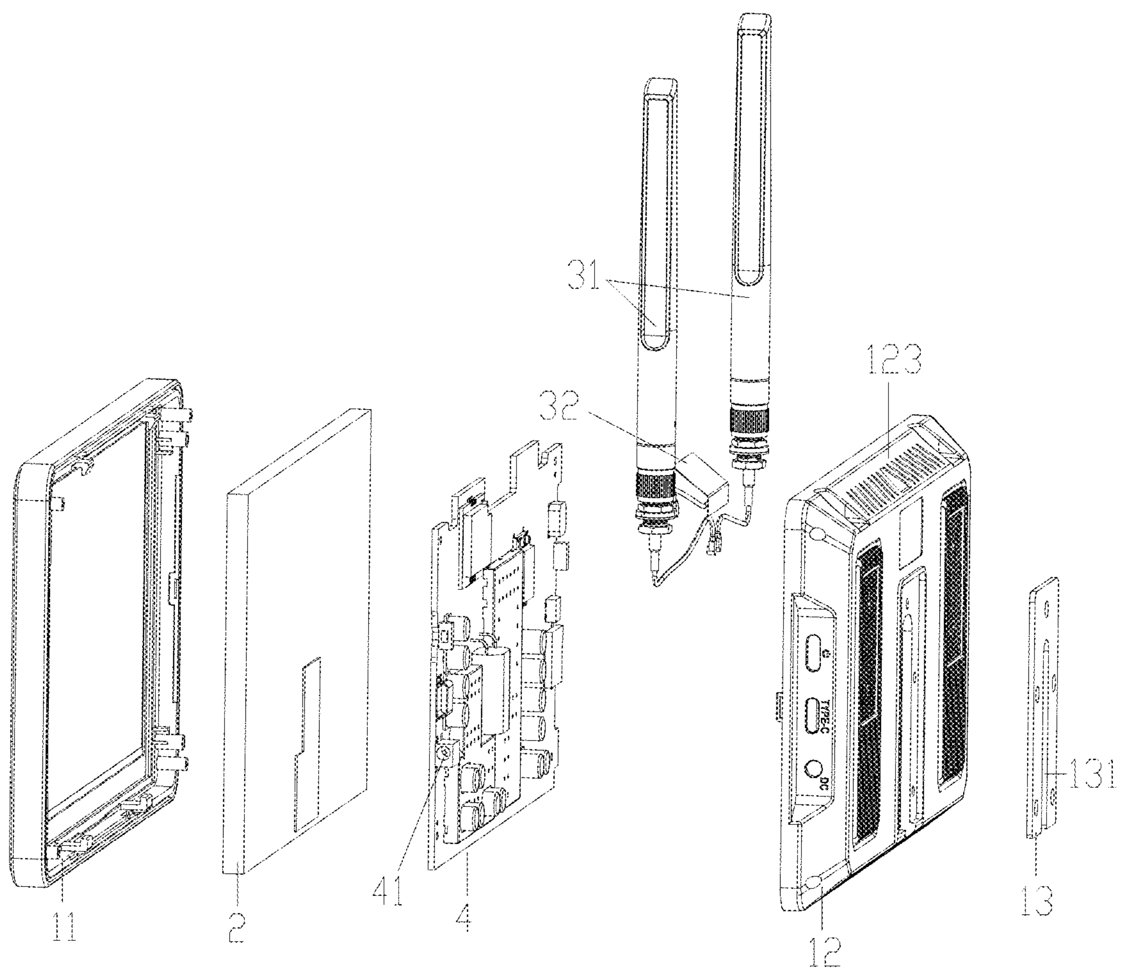
FIG. 3 is an exploded view of the vehicle-mounted monitoring device.
Figure 4:
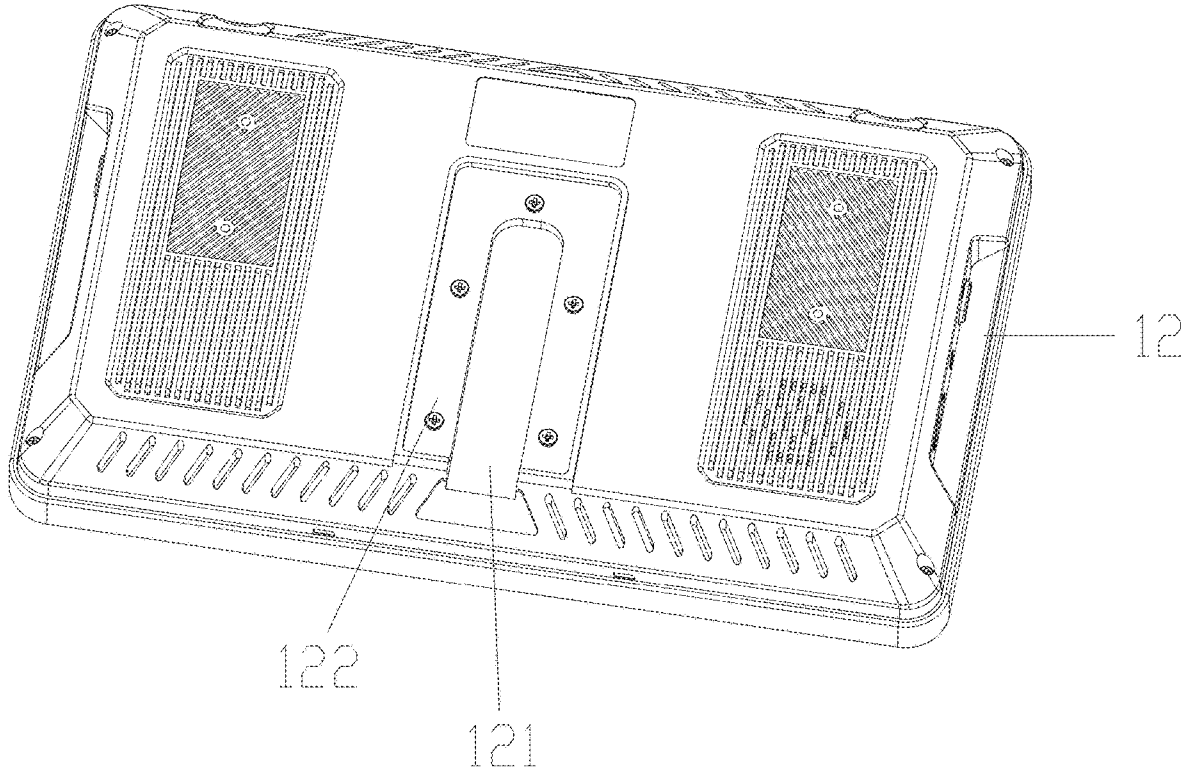
FIG. 4 is a structure view of a rear shell of the vehicle-mounted monitoring device.
Figure 5:
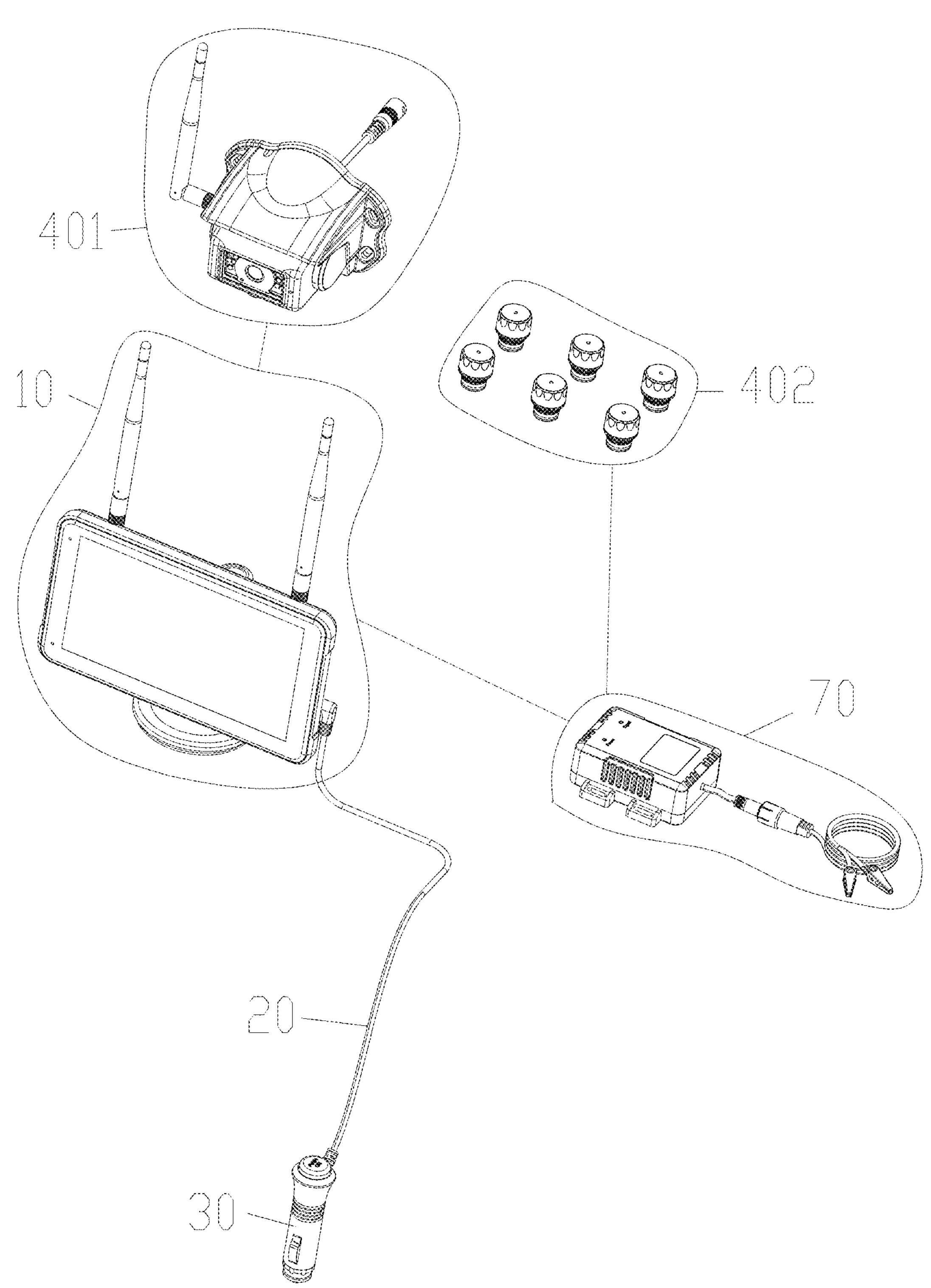
FIG. 5 is a photograph view of the vehicle-mounted monitoring system of the present invention.

The accompanying drawings in the embodiment of the present invention are combined, The technical scheme in the embodiment of the present invention is clearly and completely described, Obviously, the described embodiment is only a part of the embodiment of the present invention, but not all embodiments are based on the embodiment of the present invention, and all other embodiments obtained by ordinary technicians in the field on the premise of not doing creative work belong to the protection range of the present invention.

Referring to FIG. 1-4, an embodiment of a vehicle-mounted monitoring device 10 in the present invention is presented.

A vehicle-mounted monitoring device 10 includes a detachable main body 1 arranged in the vehicle. The main body 1 is arranged with a circuit board 4, a display screen 2, a first communication module 100, and a second communication module 200. The display screen 2, the first communication module 100, and the second communication module 200 are electrically connected to the circuit board 4. The first communication module 100 is configured to receive image data wirelessly transmitted from at least one camera 401 and to transmit the image data to the circuit board 4. The second communication module 200 is also configured to receive tire pressure data 505 wirelessly transmitted from at least one tire pressure sensor 402 and to transmit the tire pressure data 505 to the circuit board 4, the circuit board 4 then transmits both the image data and the tire pressure data 505 to the display screen 2 for display.

In this embodiment, by providing the first communication module 100 and the second communication module 200 in the vehicle-mounted monitoring device 10 to receive image signals transmitted from the camera 401 and tire pressure data 505 transmitted from the tire pressure sensor 402, to achieve reduction of excessive issues with the display screen 2, thereby simplifying the vehicle interior, improving the driver's field of vision, obviating the necessity of monitoring multiple display screens, enhancing driving focus, and increasing road safety.

Specifically, the first communication module 100 includes a first antenna 31 electrically connected to the circuit board 4, and the second communication module 200 includes a second antenna 32 also electrically connected to the circuit board 4. The first antenna 31 is configured to receive image data wirelessly transmitted from at least one camera 401 and transmit the image data to the circuit board 4. The second antenna 32 is configured to receive tire pressure data 505 wirelessly transmitted from at least one tire pressure sensor 402 and transmit the tire pressure data to the circuit board 4, enabling the vehicle-mounted monitoring device 10 to wirelessly receive both image data and tire pressure data 505. Wherein the first communication module 100 is a 2.4G module, and the first antenna 31 is a 2.4G antenna and arranged at a top of the main body 1 for better reception of wireless image data.

In one embodiment, the first antenna 31 is configured to receive high-definition video data, specifically 1080P frequency video data, for convenient monitoring by the user. The second antenna 32 can be an FPC antenna or a spring antenna. The second communication module 200 is a 433 m wireless module, meaning a transmission frequency of the second antenna 32 is 433 MHz, matching transmission frequency of the tire pressure sensor 402 for receiving tire pressure data 505.

Specifically, when the second antenna 32 is an FPC antenna, at least part of the second antenna adheres to a top or near a top of an inner side wall of the main body 1, to enhance the strength of wireless signal from the tire pressure sensor 402.

In the above embodiment, the main body 1 includes a front shell 11 and a rear shell 12 connected to the front shell 11 to form a cavity. The display screen 2 is arranged on the front shell 11, the circuit board 4 is placed inside the cavity and fixed to the rear shell 12 by screws. The first antenna 31 includes two antennas arranged at intervals at a top of the rear shell 12 and each connected to the circuit board 4 through a coaxial line. A top surface of the rear shell 12 is provided with an arc surface 123, at least part of the second antenna 32 adhering to the arc surface 123, and the second antenna 32 is connected to the circuit board 4 through a coaxial line.

Figure 29:
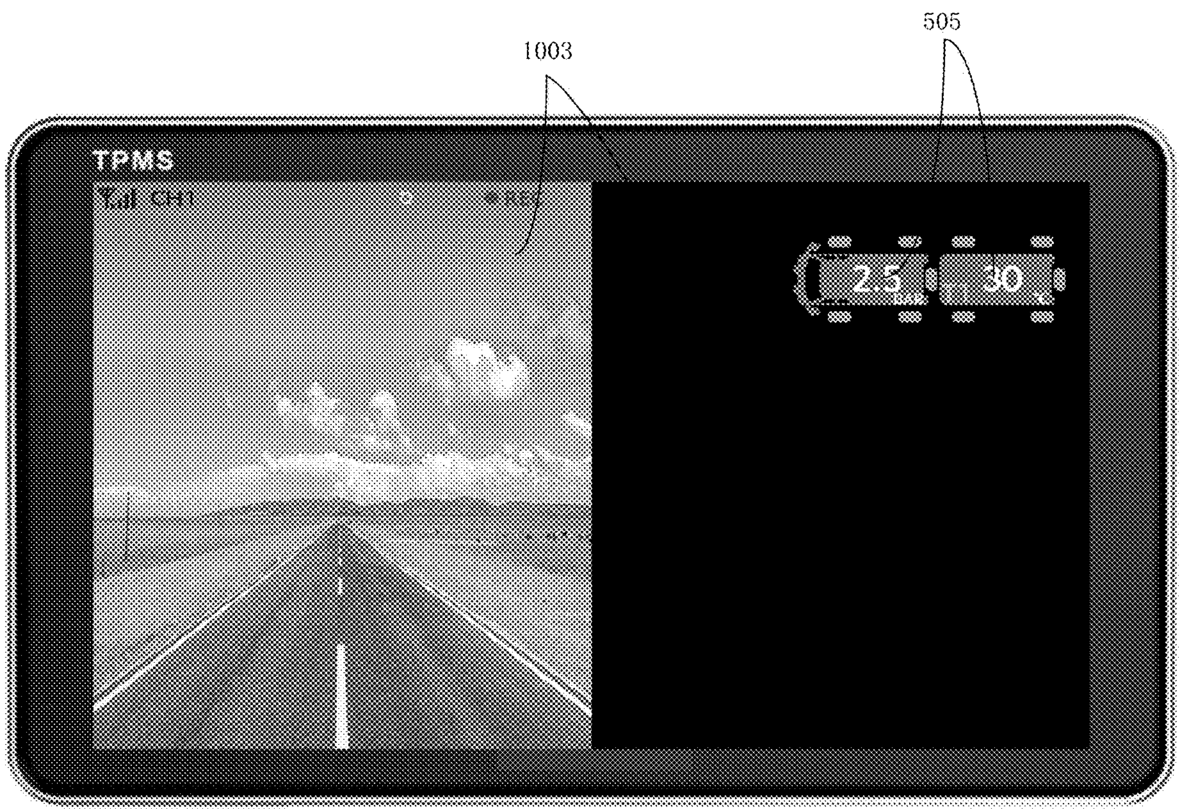
FIG. 29 is a schematic diagram showing that the display screen of the vehicle-mounted monitoring device of the present invention is divided into multiple display areas.

In one embodiment, the circuit board 4 is configured to transmit the image data and the tire pressure data 505 together to the display screen 2. The display screen 2 is divided into multiple display areas 1003 under the drive of the circuit board 4. As shown in FIG. 29, at least one of the display areas 1003 is used to display the image data, and at least one of the display areas 1003 is used to display the tire pressure data 505.

In one embodiment, the circuit board 4 is configured to transmit the image data and the tire pressure data 505 together to the display screen 2. The display screen 2 is configured to display the image data and also display the tire pressure data 505 superimposed on the image data. That is, during the use of the vehicle-mounted monitoring device 10 in this embodiment, the display screen 2 can simultaneously display the image captured by the camera 401 and the tire pressure data 505 collected by the tire pressure sensor 402, facilitating users to directly view the tire pressure data 505 and the image data without having to manually operate to view the tire pressure data 505, thus greatly simplifying the user's operation.

In one embodiment, the number of the tire pressure sensors 402 is multiple. The display screen 2 is configured to display the image data and also to display one of the tire pressure data 505 superimposed on the image data, so as to prevent multiple tire pressure data 505 collected by multiple tire pressure sensors 402 from being all distributed on the display screen 2 and affecting the user's viewing of the image captured by the camera 401, thus simplifying the screen data of the display screen 2 during the user's driving. The display screen 2 is also configured to change to display the tire pressure data 505 collected by another tire pressure sensor 402 at intervals of a first preset time. That is, on the display screen 2, the tire pressure data 505 collected by different tire pressure sensors 402 are displayed at intervals of the first preset time, so that the tire pressure data collected by multiple tire pressure sensors 402 are cyclically displayed, facilitating the user to monitor the tire pressure data 505 of each tire.

In one embodiment, the tire pressure data 505 includes one or more of the tire pressure, the tire temperature, and the battery power information of the tire pressure sensor 402, so that the user can understand the tire pressure, the temperature, and the battery power of the tire pressure sensor 402 itself through the display screen 2.

In one embodiment, the display screen 2 directly displays the abnormal tire pressure data 505 when the tire pressure data 505 is abnormal. That is, when the tire pressure data 505 collected by a certain tire pressure sensor 402 is abnormal, the user can observe the tire pressure data 505 collected by the abnormal tire pressure sensor 402 on the display screen 2 without any operation, so as to check the tires and handle the problem in a timely manner.

The circuit board 4 drives the display screen 2 to display a tire pressure alarm indication when the tire pressure data 505 is abnormal. The abnormality in the tire pressure data 505 can be that the tire pressure is higher than the first preset value, the tire temperature is higher than the preset temperature, the tire pressure is lower than the second preset value, the tire pressure drops by the third preset value within the second preset time, the tire pressure drops by the fourth preset value within the third preset time, the tire pressure sensor signal is lost, and so on. Herein, the second preset time is less than the third preset time. That is, the tire pressure dropping by the third preset value within the second preset time indicates a rapid deflation of the tire, and the tire pressure dropping by the fourth preset value within the third preset time indicates a slow deflation of the tire. The first preset value, the preset temperature, the second preset value, the second preset time, the third preset time, the third preset value, and the fourth preset value can be customized by the user or set at the factory when the product is shipped. This is to alert the user when the tire pressure is abnormal, prevent accidents, and improve driving safety.

In one embodiment, when there are multiple abnormal tire pressure data 505, the display screen 2 displays one of the multiple abnormal tire pressure data 505 in rotation at the first preset time interval based on the entry time of the abnormal tire pressure data 505. That is, when multiple tire pressure data 505 are abnormal, the tire pressure data 505 displayed on the display screen 2 are cyclically displayed among the multiple abnormal tire pressure data 505, so that the user can be aware of the abnormal phenomena of multiple tires.

Specifically, the first preset time can be 3 seconds, 5 seconds, 10 seconds, etc., and the first preset time is not limited herein.

In one embodiment, the tire pressure alarm indication is one or more of the items as follows: a tire pressure alarm icon, a real-time tire imagery, and an abnormal tire virtual imagery. The real-time tire imagery is the real-time image of the abnormal tire captured by the camera 401. The abnormal tire virtual imagery is the virtual image data pre-stored in the circuit board 4. The virtual image data includes the dynamic imagery data of excessively high tire pressure, excessively low tire pressure, and the tire turning red, or a combination thereof. Through using image display, it enables the user to intuitively comprehend the condition of the tire and allows the driver to better determine whether it is safe to pull over for inspection, thereby enhancing the driving safety and user convenience.

In one embodiment, the circuit board 4 drives the display screen 2 to display a reminder indication when the battery power transmitted by the tire pressure sensor 402 is below a preset power level, so that the user can replace the tire pressure sensor 402, change the battery, or recharge it in a timely manner.

In one embodiment, the vehicle-mounted monitoring device 10 further includes an alarm unit 5 arranged within the main body 1 and electrically connected to the circuit board 4. The circuit board 4 drives the alarm unit 5 to alert when the tire pressure data 505 is abnormal. The alarm unit 5 is one or more of a horn, a buzzer, and an alarm light. In this way, when the tire pressure data 505 is abnormal, a reminder can be provided through a combination of sound, light, and the relevant display on the screen, enabling the user to intuitively understand the tire abnormality from both visual and auditory perspectives, thus bringing a better user experience.

Specifically, the alarm unit 5 is a buzzer, and the circuit board 4 drives the buzzer to emit a tire blowout sound and drives the display screen 2 to display a tire blowout image or a tire blowout indicator when the tire pressure changes from a normal pressure value to below the third preset value within a preset time period, the tire blowout image is either the real-time image of the tire captured by the camera 401 or a virtual dynamic image of the tire blowout.

In the above embodiment, the display screen 2 displays the image captured by one camera 401 and the tire pressure data 505 on the regular use interface during the user's driving.

In one embodiment, the circuit board 4 displays a simulated vehicle model image 20 through the display screen, and the simulated vehicle model image 20 is shown on the regular use interface during the user's driving. Specifically, the simulated vehicle model image 20 includes a vehicle shape icon 261, and the vehicle shape icon 261 includes a vehicle body icon 26 and multiple first tire icons 25 located on or beside the vehicle body icon 26. Each of first tire icons 25 corresponds to one of the tire pressure sensors 402, and the position of each first tire icon 25 on the vehicle body icon 26 corresponds to the position of a motor vehicle tire on the motor vehicle. The first tire icon 25 flashes or is displayed differently from other first tire icons 25 when the display screen 2 displays the tire pressure data 505 collected by the corresponding tire pressure sensor 402. The tire pressure data 505 is located on or beside the vehicle shape icon 261, so that the user can clearly understand which first tire icon 25 the tire pressure data 505 currently displayed on the display screen 2 represents, that is, the user can understand which tire the tire pressure data 505 currently displayed on the display screen 2 represents. When the tire pressure data 505 of a certain tire is abnormal, combined with the flashing first tire icon 25, the user can know which tire the abnormal tire pressure data 505 corresponds to, which is convenient for the user to get off the vehicle and check the corresponding tire, saving the time of tedious inspection of multiple tires.

In one embodiment, the display screen 2 turns the color of the first tire icon 25 corresponding to the abnormal tire pressure data 505 to red when the tire pressure data 505 is abnormal.

In one embodiment, the circuit board 4 transmits the tire pressure and the tire temperature to the display screen 2 for display. The tire pressure data 505 are the necessary monitoring data of the tire, so that the tire can be inspected and dealt with in a timely manner when the tire pressure and the tire temperature are abnormal.

In one embodiment, the display screen 2 is a touch screen, the touch screen is configured to respond to user touch control commands for a specific task and to display the control results of the task. The control results include a tire pressure management menu, switching among images captured by multiple cameras 401, switching preset data of multiple tire pressure sensors 402, and adjusting abnormal tire pressure alarm values. The abnormal tire pressure alarm values include high-pressure alarm values and low-pressure alarm values. The tire pressure management menu at least includes tire pressure data 505, enabling users to switch the images captured by different cameras 401, view tire pressure data 505, and adjust abnormal tire pressure alarm values through the touch screen.

Figure 24:
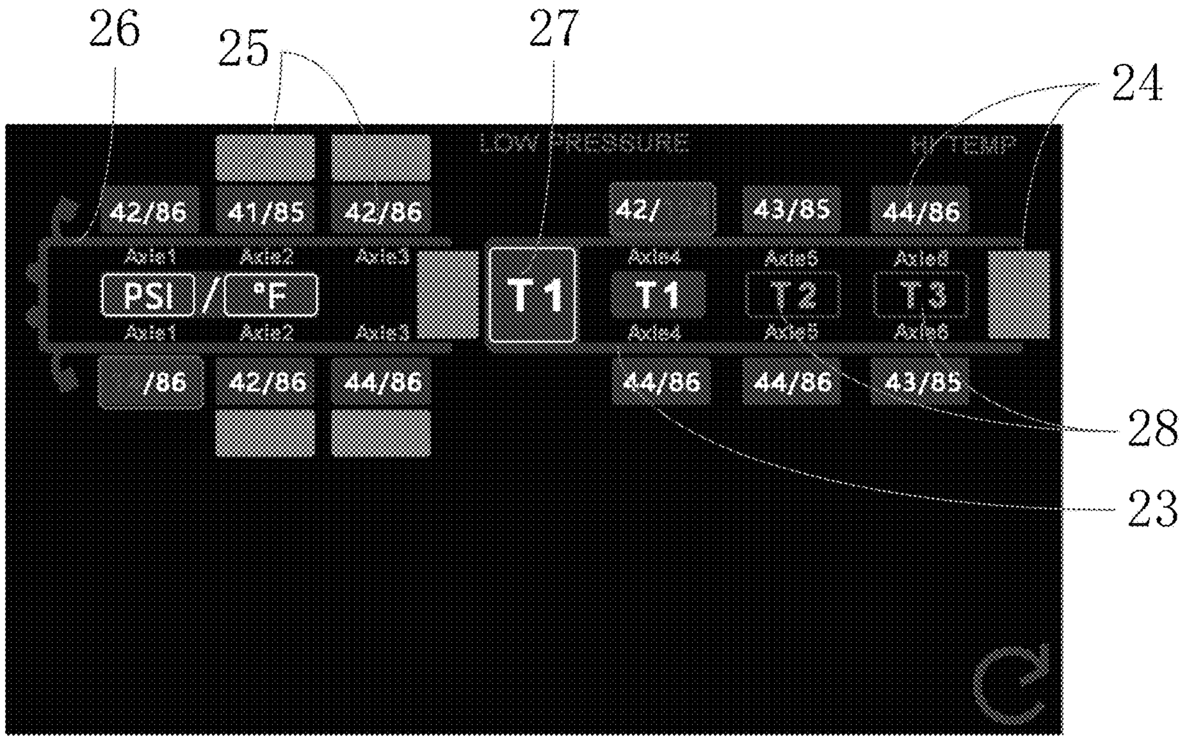
FIG. 24 is a schematic diagram of the display screen of the vehicle-mounted monitoring device in a tire pressure management menu state.
Figure 26:
FIG. 26 is a schematic diagram of the display screen of the vehicle-mounted monitoring device in a state of tire pressure anomaly.
Figure 27:
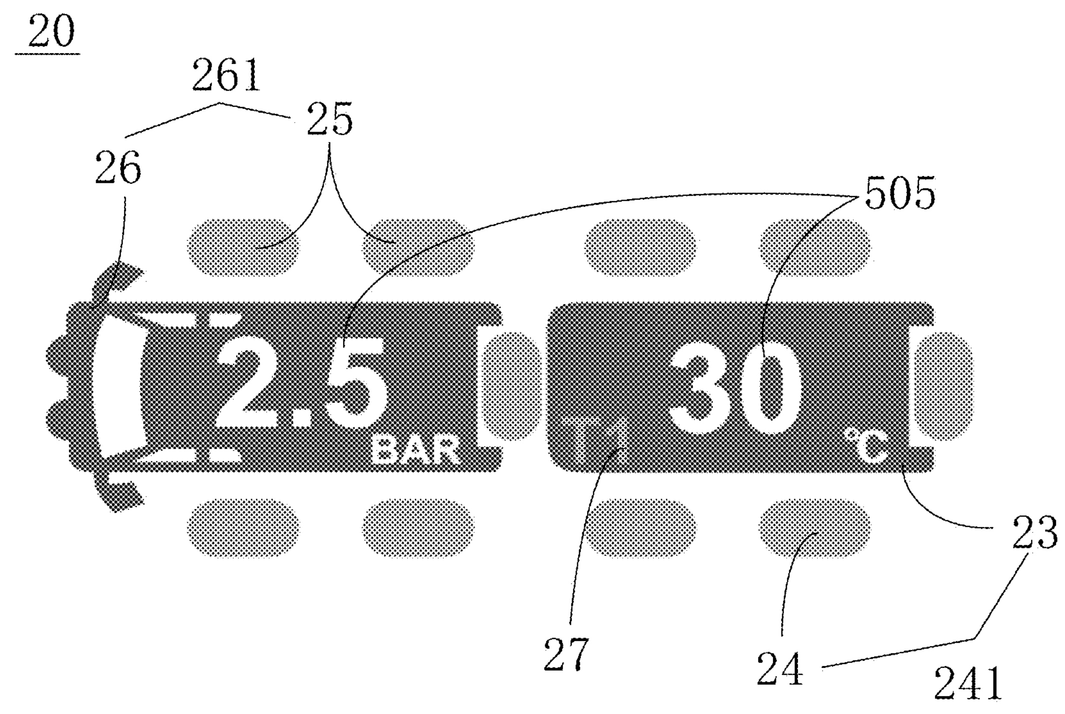
FIG. 27 is a structure view of a simulated vehicle model image of the vehicle-mounted monitoring device of the present invention.

Specifically, in this embodiment, when the tire pressure data 505 is abnormal, the user can enter the tire pressure management menu by touching the tire pressure alarm icon on the touch screen 2. In the interface, data indicating an abnormality is prominently displayed in red, along with a red text description of the abnormal tire pressure, allowing users to easily view the abnormal tire pressure data 505, as shown in FIG. 24 and FIG. 26, the tire pressure alarm icon is represented by an exclamation mark as shown in FIG. 24 and text at top in FIG. 26.

Figure 10:
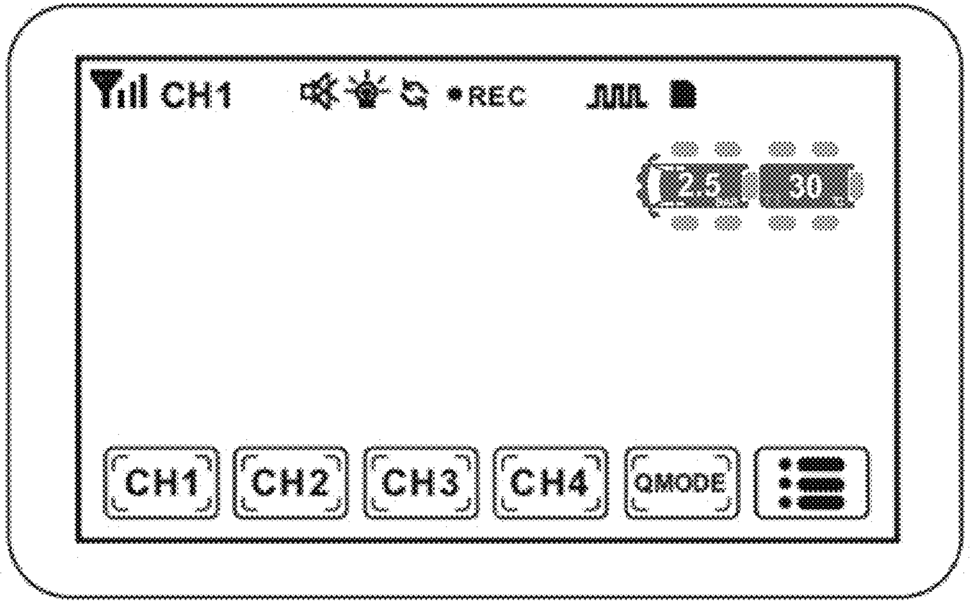
FIG. 10 is a schematic diagram of a display screen of the vehicle-mounted monitoring device in a first set of shortcut menu states.
Figure 12:
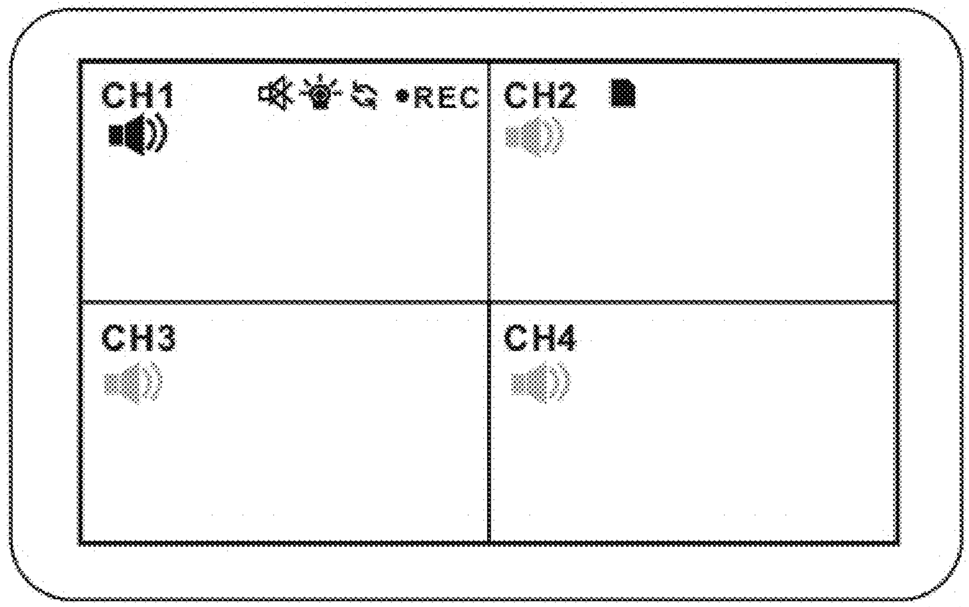
FIG. 12 is a schematic diagram of the display screen of the vehicle-mounted monitoring device entering a mode menu QMODE state.
Figure 13:
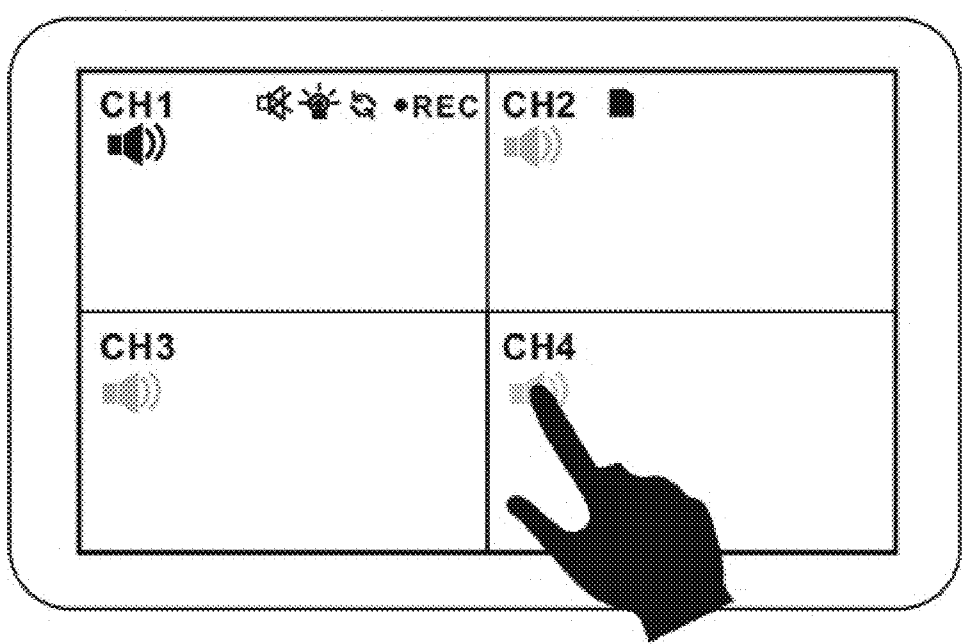
FIG. 13 is a schematic diagram of a user operating the display screen in the mode menu QMODE state of the vehicle-mounted monitoring device.
Figure 14:
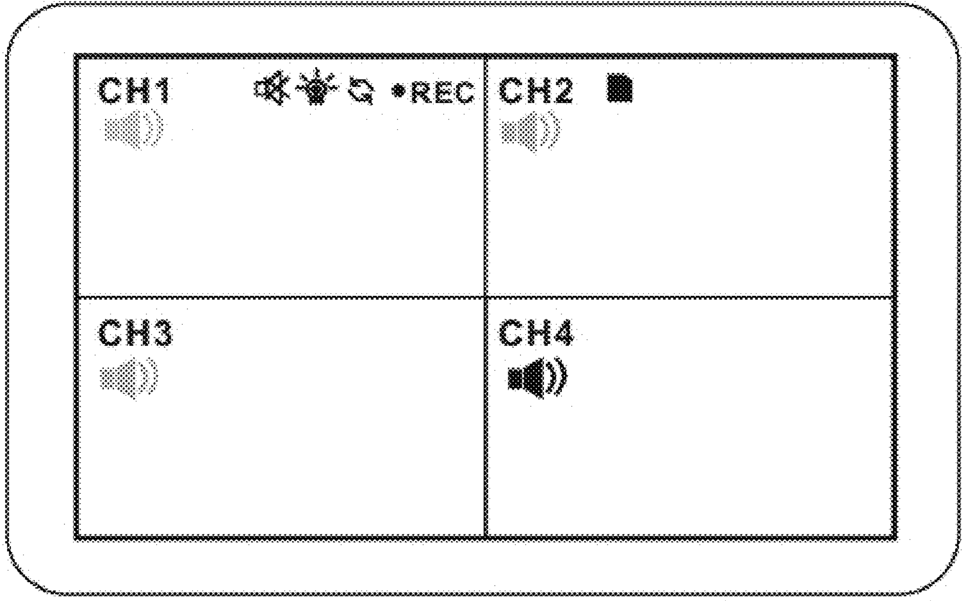
FIG. 14 is a schematic diagram of the display screen of the vehicle-mounted monitoring device entering the mode menu QMODE state.
Figure 15:
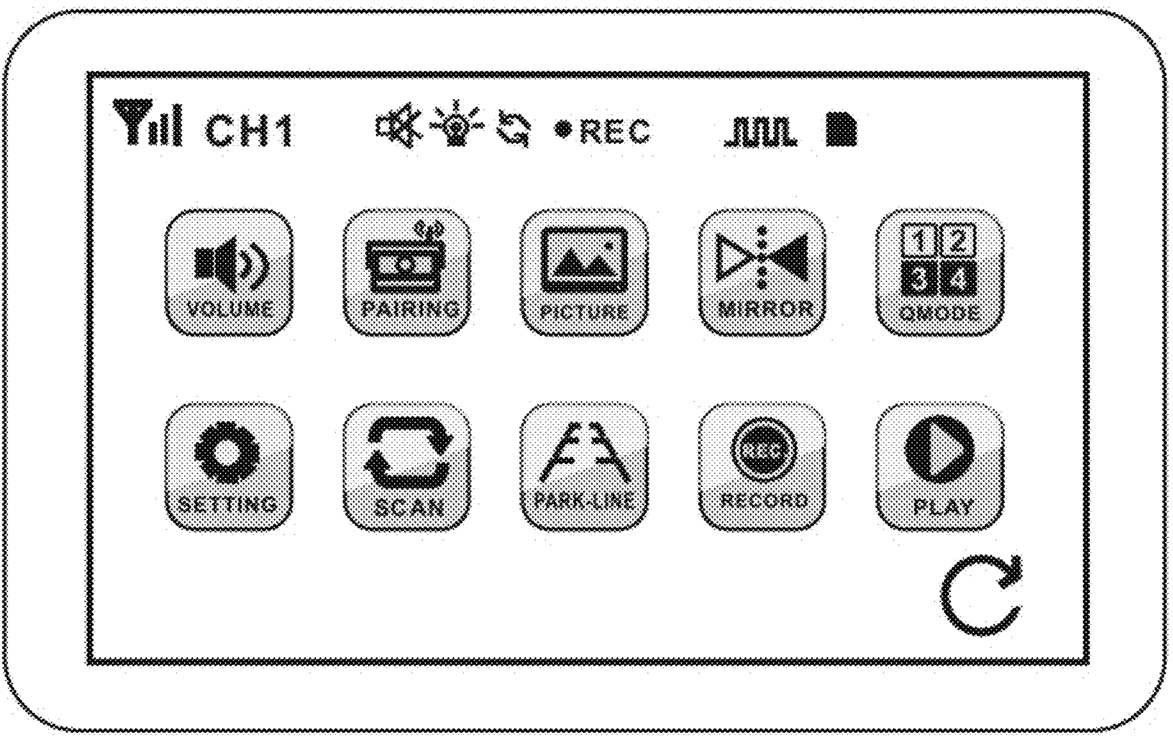
FIG. 15 is a schematic diagram of the display screen of the vehicle-mounted monitoring device in a main menu function state.

When the vehicle-mounted monitoring device 10 is in initial state, the display screen 2 displays image captured by one of the cameras 401. By tapping the display screen 2, a first group of shortcut menus pops up, as shown in FIG. 10. The first group of shortcut menus includes multiple camera 401 switching channels, a mode menu QMODE, and a main menu identifier. For example, if there are four cameras 401, the switching channels would be CH1, CH2, CH3, and CH4. When the user taps the mode menu QMODE, the display screen 2 displays all images from cameras 401, as shown in FIG. 12-FIG. 14. Tapping a sound icon allows the user to turn on or off sound captured by the camera 401. When the user taps a rightmost main menu list, the user enters main menu functions, as shown in FIG. 15. The main menu functions include two rows: the first row from left to right includes sound settings for adjusting camera volume, a pairing unit for camera pairing, a PICTURE unit, a MIRROR unit, and the mode menu QMODE; the second row from left to right includes a SETTING icon, a SCAN icon, a parking line switch menu, a RECORD icon, and a PLAY icon.

Figure 16:
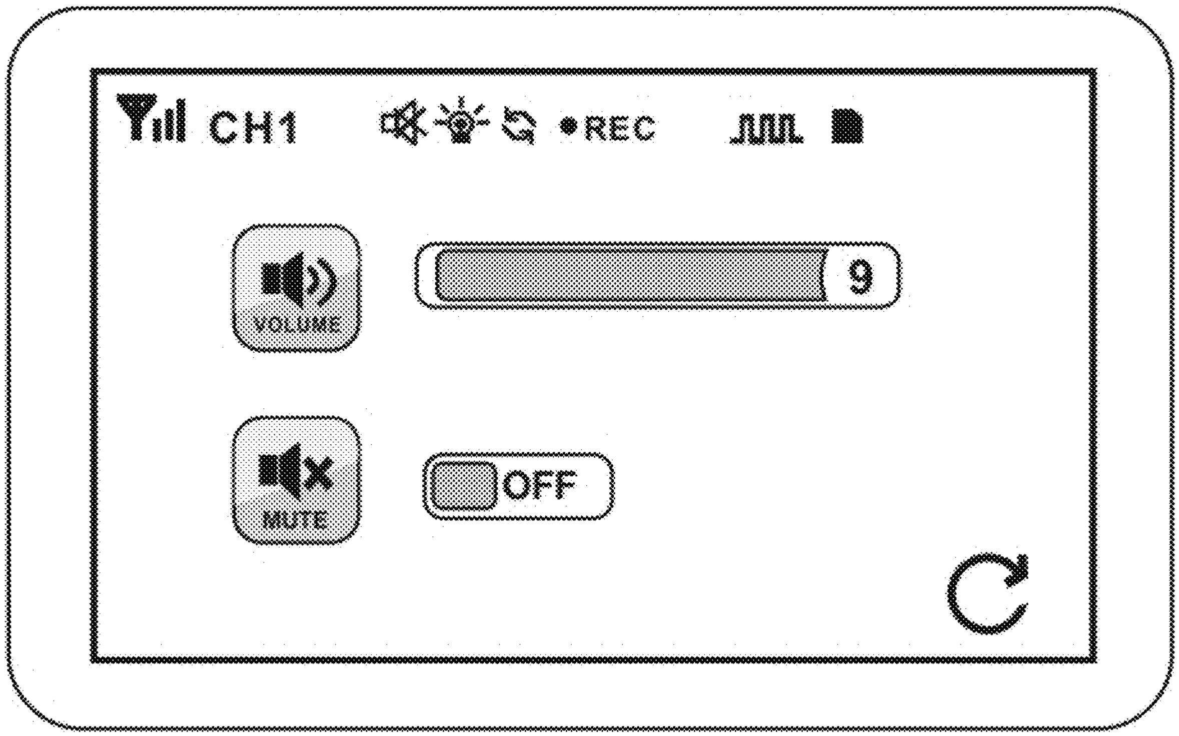
FIG. 16 is a schematic diagram of the display screen of the vehicle-mounted monitoring device entering a sound setting state.
Figure 17:
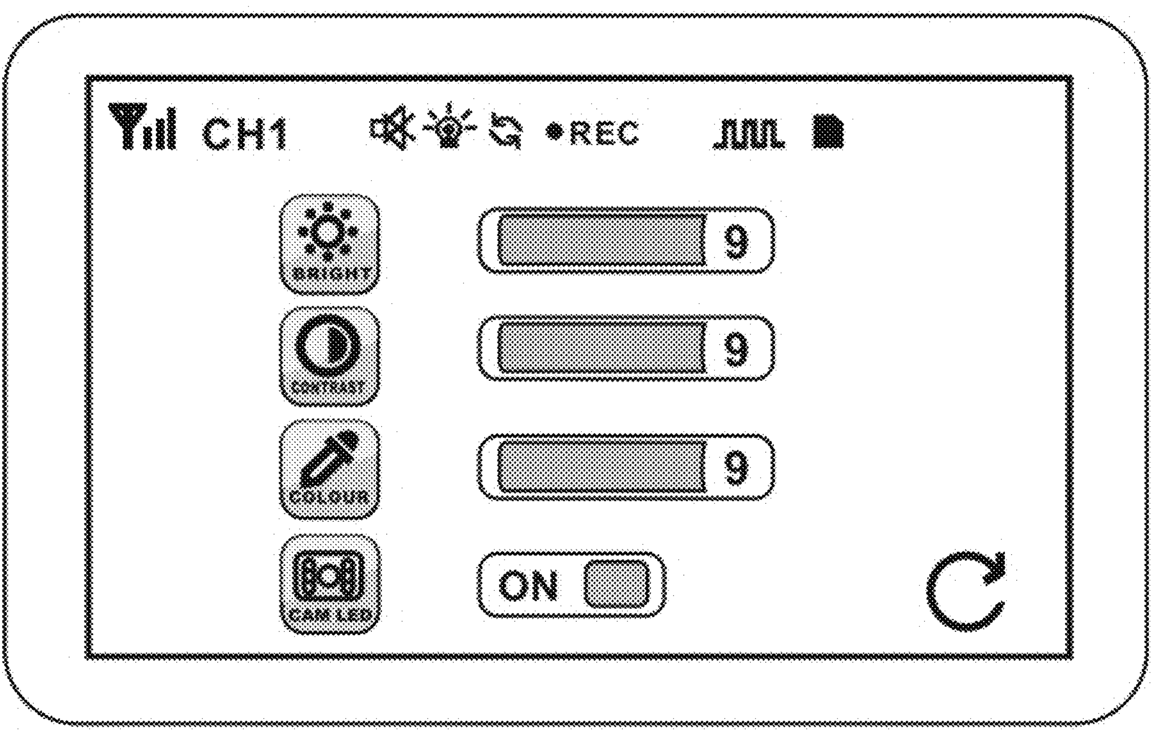
FIG. 17 is a schematic diagram of the display screen of the vehicle-mounted monitoring device entering a PICTURE unit state.
Figure 18:
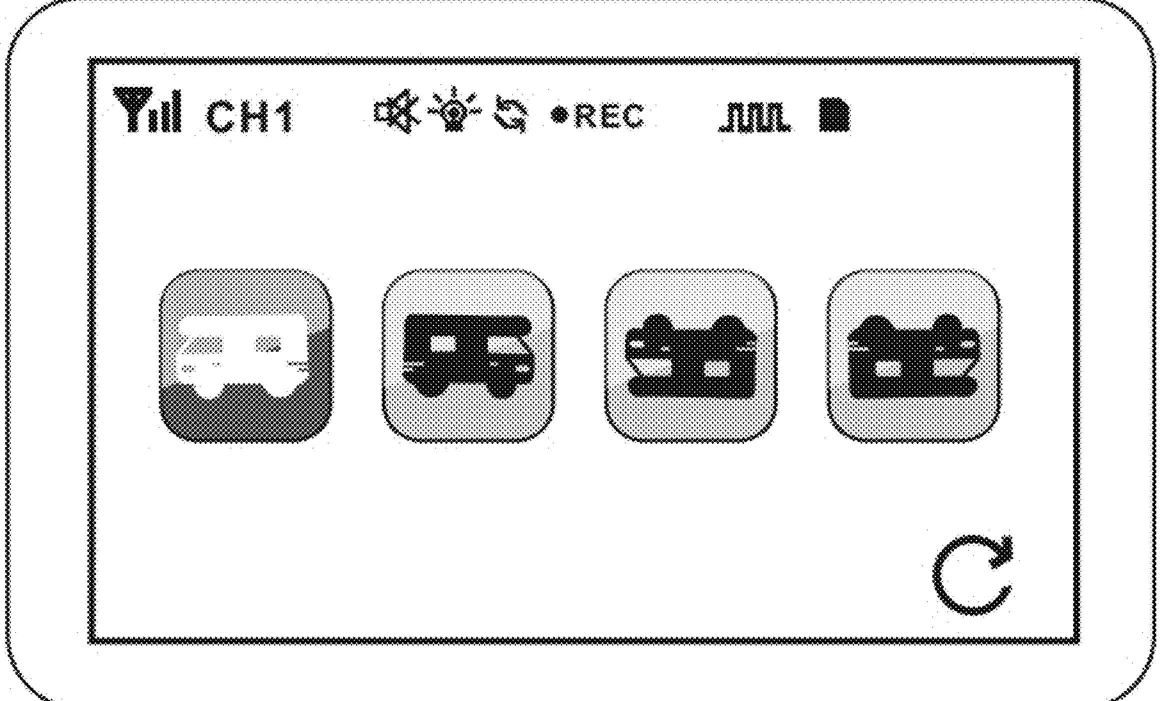
FIG. 18 is a schematic diagram of the display screen of the vehicle-mounted monitoring device entering a MIRROR unit state.
Figure 19:
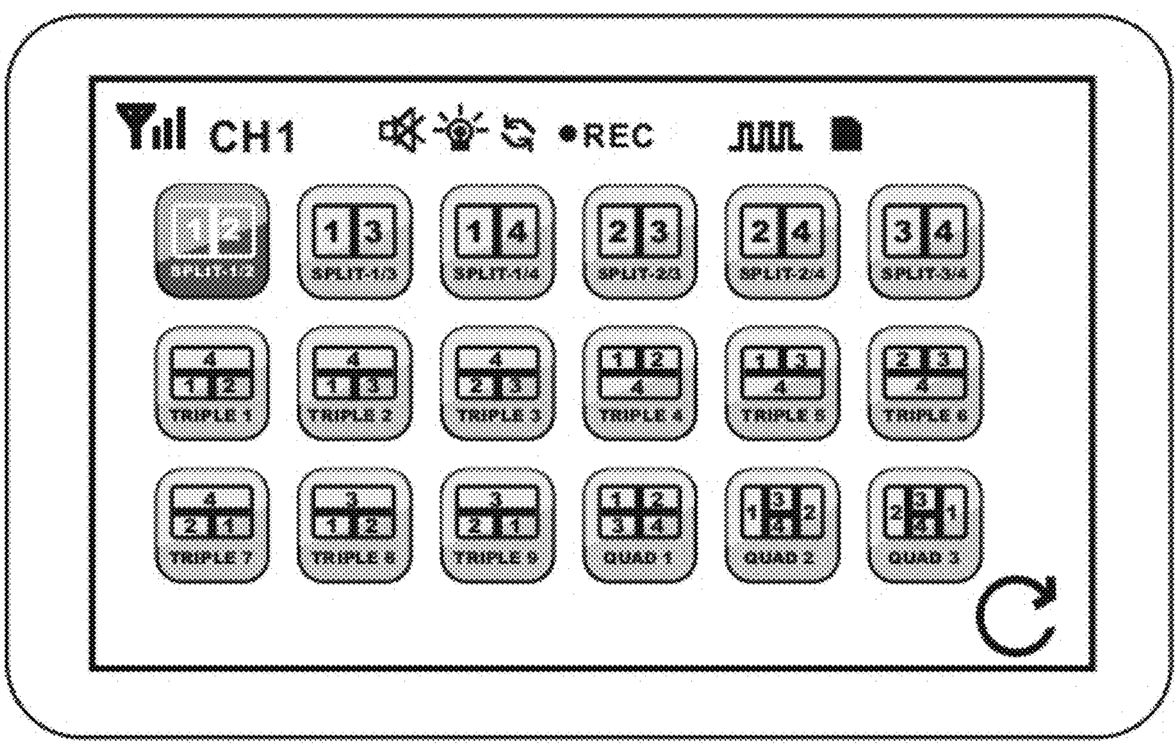
FIG. 19 is a schematic diagram of the display screen of the vehicle-mounted monitoring device entering a SETTING icon state.
Figure 20:
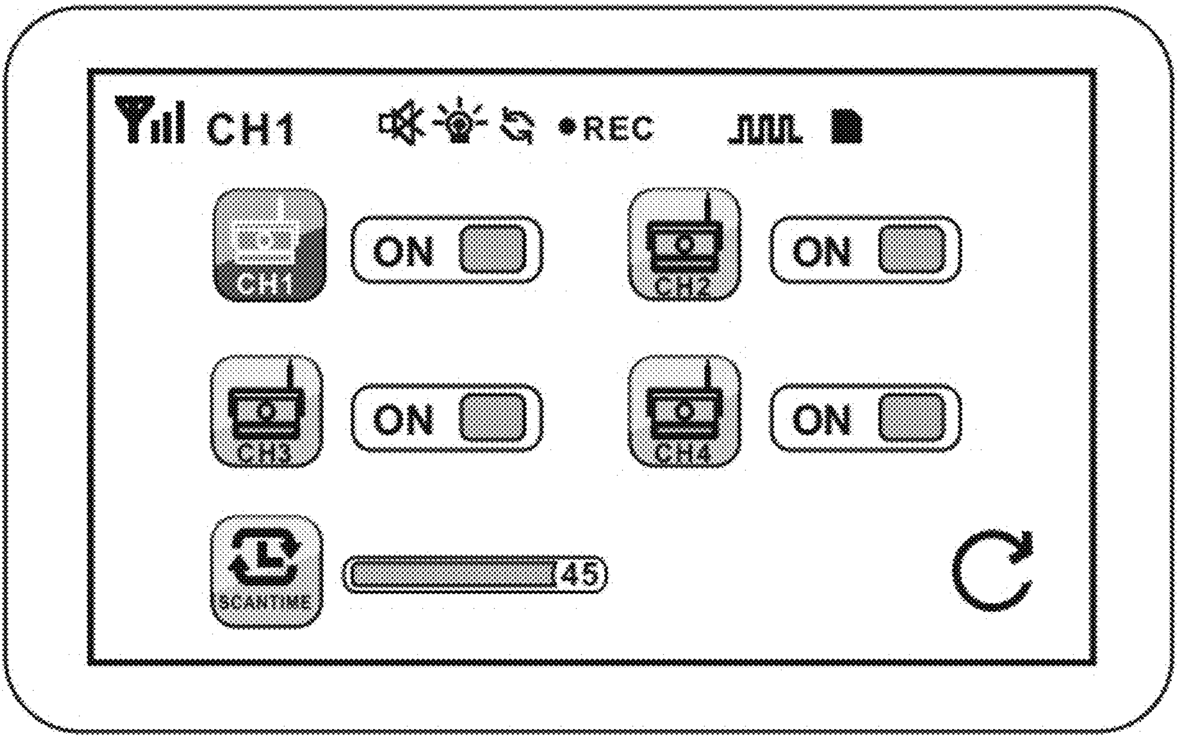
FIG. 20 is a schematic diagram of the display screen of the vehicle-mounted monitoring device entering a SCAN icon state.
Figure 21:
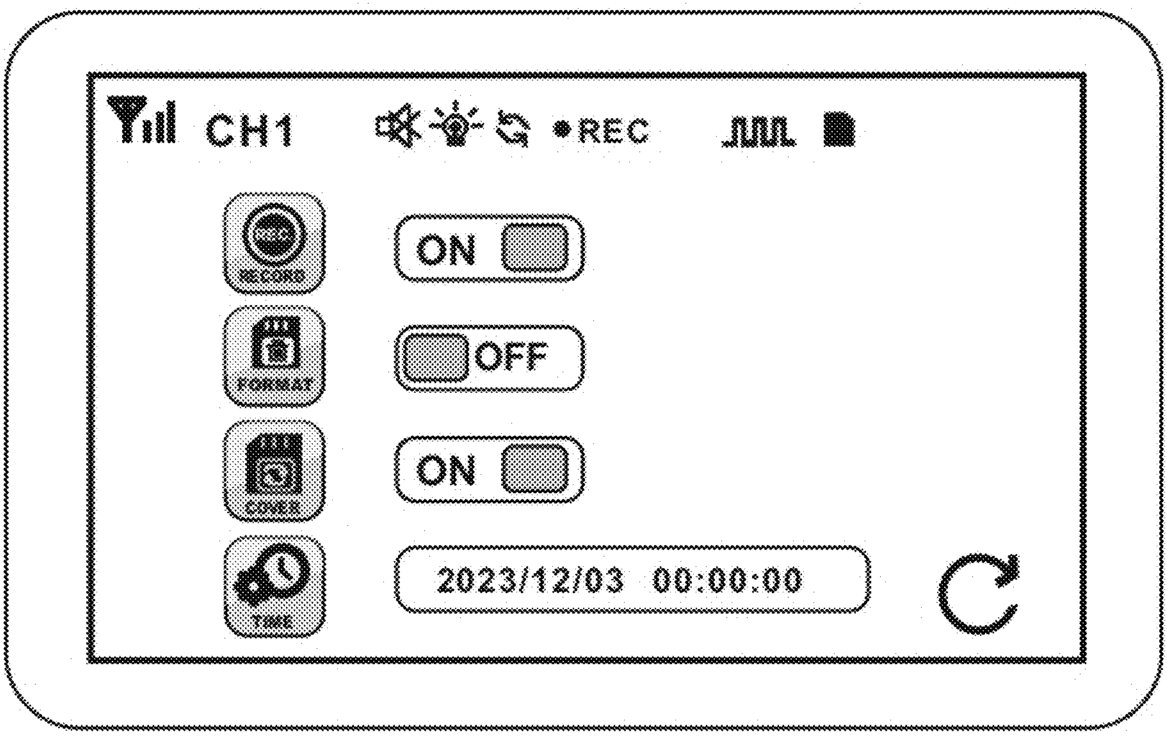
FIG. 21 is a schematic diagram of the display screen of the vehicle-mounted monitoring device entering a RECORD icon state.
Figure 22:
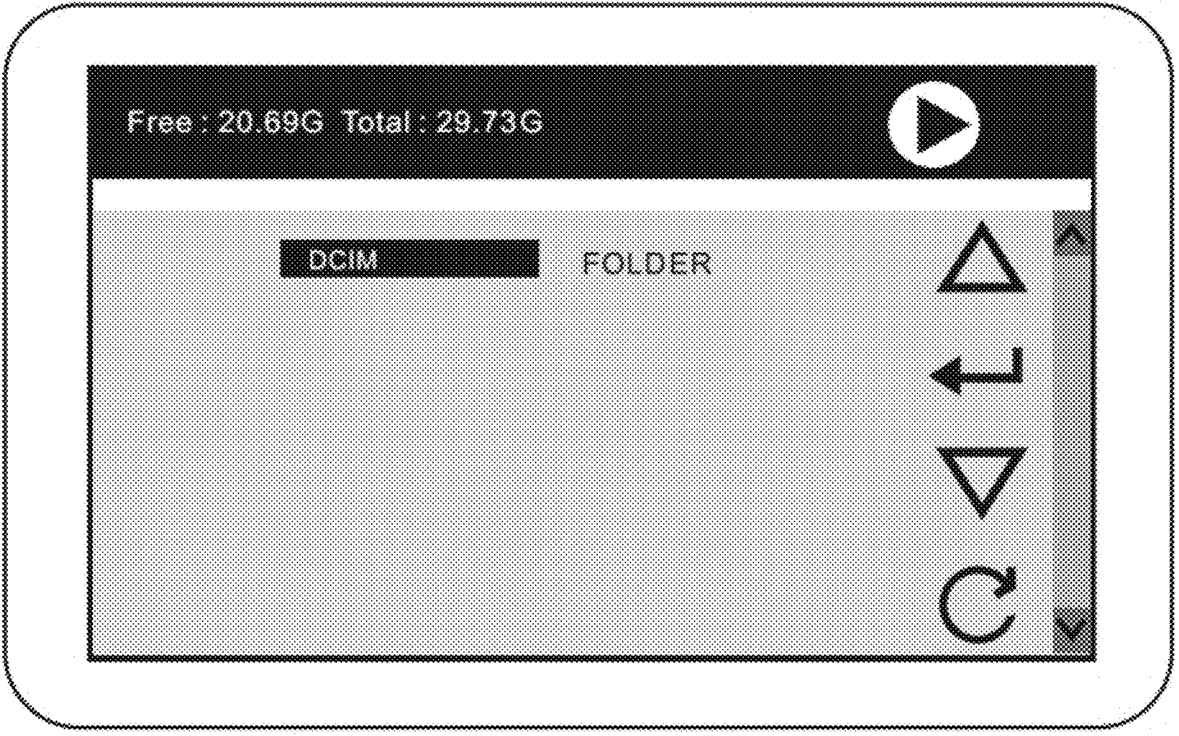
FIG. 22 is a schematic diagram of the display screen of the vehicle-mounted monitoring device entering a PLAY icon state.

Specifically, the sound settings are shown in FIG. 16; the PICTURE unit adjusts brightness, contrast, color of display screen 2, and a night light switch of camera 401, as shown in FIG. 17; the MIRROR unit is configured for flipping of the camera 401 images, as shown in FIG. 18; the SETTING icon sets the arrangement of images captured by multiple cameras 401 in the mode menu QMODE, as shown in FIG. 19; the SCAN icon switches the camera 401 channels, as shown in FIG. 20; the RECORD icon views the status of a TF card, storage status, video storage overwrite, and video storage time, as shown in FIG. 21; the PLAY icon sets video playback, as shown in FIG. 22.

Figure 11:
FIG. 11 is a schematic diagram of the display screen of the vehicle-mounted monitoring device in a second set of shortcut menu states.
Figure 23:
FIG. 23 is a schematic diagram of the display screen of the vehicle-mounted monitoring device in a second set of short-cut menu states.

The vehicle-mounted monitoring device 10 is in initial state, when the user taps the display screen 2 again, the second group of shortcut menus pops up, as shown in FIG. 11 and FIG. 23, the second group of shortcut menus corresponds to the control of the camera 401 when taps the display screen 2. If the display screen 2 is on CH1, the second group of shortcut menus is the operation menu for CH1. Specifically, the second group of shortcut menus includes a parking line switch menu, a sound switch menu for camera 401, a brightness adjustment menu for display screen 2, a night light switch menu for camera 401, a recording switch menu for camera 401, and a SCAN menu or tire pressure monitoring menu TPMS for switching camera 401 channels. The user can tap the required menu to access the corresponding function. For example, when tapping the tire pressure management menu TPMS, the interface of the TPMS can be entered.

In one embodiment, when the vehicle-mounted monitoring device 10 is in the initial state, the display screen 2 displays the image captured by one of the cameras 401 and a piece of tire pressure data 505, as shown in FIG. 10. At this time, the display screen 2 displays the tire pressure management menu interface when the user touches the simulated vehicle model image 20. The tire pressure management menu interface includes an enlarged simulated vehicle model image 20, specifically as shown in FIG. 24. In the tire pressure management menu interface, at least one of the tire pressure and the tire temperature is displayed on or beside the first tire icon 25 corresponding to the tire pressure sensor 402, so that the user can intuitively understand the tire pressure data 505 collected by the multiple tire pressure sensors 402.

In one embodiment, the touch display screen, when displaying the tire pressure alarm indication or the blowout image, additionally enables the user to exit from the interface through touch-based interactions, so as to prevent the display screen 2 from continuously showing the tire pressure alarm indication or the blowout image and affecting the user's understanding of other normal tire pressure data 505, which is convenient for the user to use.

Figure 25:
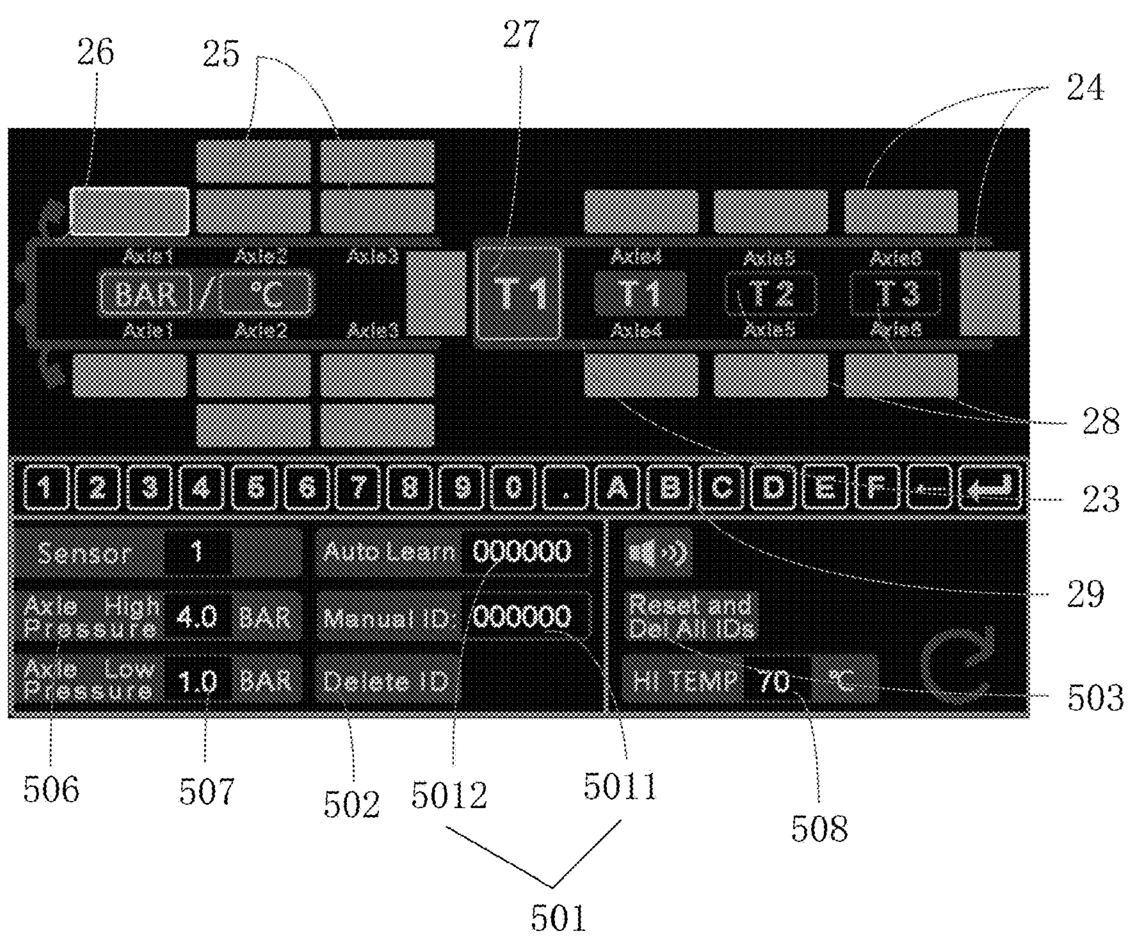
FIG. 25 is a schematic diagram of the display screen of the vehicle-mounted monitoring device in a tire pressure information setting interface.

In one embodiment, in the tire pressure management menu interface, the display screen 2 displays the tire pressure setting interface corresponding to the first tire icon 25 when the user touches the first tire icon 25, as shown in FIG. 25. The tire pressure setting interface includes a high-pressure alarm value 506, a low-pressure alarm value 507, a temperature alarm value 508 and a keyboard 29. When the user touches one of the high-pressure alarm value 506, the low-pressure alarm value 507 and the temperature alarm value 508, the corresponding high-pressure alarm value 506, low-pressure alarm value 507 and temperature alarm value 508 can be set through the characters on the touch keyboard 29, so that the user can configure the abnormal tire pressure values.

Referencing FIG. 7, FIG. 24, FIG. 25 and FIG. 27, the tire pressure setting interface further includes a pairing unit 501, that is, the tire pressure management menu also includes a pairing unit 501. After the user touches the pairing unit 501 on the touch screen, the circuit board 4 enters a state for pairing with the tire pressure sensor 402. During the process, once the tire pressure sensor 402 is installed on the tire valve and activated, the circuit board 4 is able to pair with the tire pressure sensor 402 through the second antenna 32. In this way, the tire pressure sensor 402 can be paired with the second communication module 200, and the first tire icon 25 can be matched with the tire pressure sensor 402 for use, so as to complete the pairing of the tire pressure sensor 402, and enable the first tire icon 25 to display the data collected by the paired tire pressure sensor 402.

In one embodiment, the touch screen also provides an interface for entering the tire pressure sensor ID after the user touches the pairing unit 501. Once the user inputs the tire pressure sensor ID, the circuit board 4 pairs with the tire pressure sensor 402 through the second antenna 32.

Specifically, the pairing unit 501 includes automatic pairing 5012 and manual pairing 5011. When the user touches the automatic pairing 5012 on the display screen 2, and at the same time, the tire pressure sensor 402 is screwed onto the tire, the display screen 2 will automatically pair and communicate the second communication module 200 with the tire pressure sensor 402, so as to achieve the matching use of the first tire icon 25 with the tire pressure sensor 402. When the user touches the manual pairing 5011 on the display screen 2 and inputs the pairing code corresponding to the tire pressure sensor 402 through the touch keyboard 29, the display screen 2 will pair the tire pressure sensor 402 with the second communication module 200 for use, and can also achieve the matching use of the first tire icon 25 with the tire pressure sensor 402.

In one embodiment, the tire pressure setting interface further includes a deletion unit 502. That is, the tire pressure management menu further includes a deletion unit 502. After the user touches the deletion unit 502 on the touch screen, it clears the ID of the tire pressure sensor that is paired with the circuit board 4, so as to terminate the matching use of the first tire icon 25 with the tire pressure sensor 402, facilitating the management of tire pressure sensor IDs by the user.

In one embodiment, the tire pressure setting interface further includes a reset unit 503. After the user interacts with the reset unit 503 on the touch screen, it clears all the IDs of the tire pressure sensors that are paired with the circuit board 4, so as to terminate the pairing between all the first tire icons 25 and the tire pressure sensors 402 at one time, making it convenient for users to remove all tire pressure sensors 402 paired with the circuit board 4.

In one embodiment, the simulated vehicle model image 20 further includes a carriage icon 241. The carriage icon 241 includes a carriage body icon 23 and a second tire icon 24 located on the carriage body icon 23 or beside the carriage body icon 23. The carriage body icon 23 is positioned behind the vehicle body icon 26. Each second tire icon 24 is used corresponding to a tire pressure sensor 402, and the position of each second tire icon 24 on the carriage body icon 23 corresponds to the position of the motor vehicle tire on the motor vehicle carriage. At least one first tire icon is distributed at one end of the vehicle body icon 26 adjacent to the carriage icon 241, and/or at least one second tire icon is distributed at one end of the carriage icon 241 away from the vehicle body icon 26.

In one embodiment, the simulated vehicle model image 20 further includes a carriage icon 241. The carriage icon 241 includes a carriage body icon 23 and a second tire icon 24 that is located on or beside the carriage body icon 23. The carriage body icon 23 is positioned behind the vehicle body icon 26. Each second tire icon 24 is used in correspondence with a tire pressure sensor 402, and the position of each second tire icon 24 on the carriage body icon 23 corresponds to the position of the motor vehicle tire on the motor vehicle carriage.

For existing motor vehicles, such as sedans, vans, and RVs, generally only four tires need to be monitored for tire pressure. That is, it is only necessary to select four first tire icons 25 in the carriage icon to be matched with the tire pressure sensors 402 on the corresponding tires, or it is also feasible to select the second tire icons 24 in the carriage icon 241 for use.

In the case of trucks and trailers, generally, there is one cab and a carriage. The cab is usually equipped with four tires, and the trailer of the carriage is equipped with at least four tires. In some cases, the trailer of the carriage is equipped with at least six tires, and so on. In this embodiment, the tires on the cab can be matched with the first tire icons 25 for use, and the tires on the carriage can be matched with the second tire icons 24 for use, so that the vehicle-mounted monitoring device 10 of this embodiment can be adapted to display for different types of motor vehicles.

Generally, a spare tire is installed at the rear of existing motor vehicles. At least one first tire icon 25 is distributed at one end of the vehicle body icon 26 adjacent to the carriage body icon 23, and/or at least one second tire icon 24 is distributed at one end of the carriage body icon away from the vehicle body icon. This arrangement enables the present embodiment to be adapted for use with motor vehicles equipped with a spare tire.

Specifically, when the user touches on each second tire icon 25, the display screen 2 can also display the tire pressure setting interface corresponding to the second tire icon 25, so as to facilitate the user's use.

In one embodiment, there are multiple carriage body icons 23, and each carriage body icon 23 is respectively used corresponding to a carriage of a motor vehicle. That is, the user can configure different trailers for use.

The tire pressure management menu interface further includes multiple carriage touch indicators 28. Each of carriage touch indicators 28 corresponds to a carriage icon for use respectively. When the user touches a carriage touch indicator 28, the display screen 2 will also activate or deactivate the corresponding carriage icon 241 for use. When different carriages are configured for use with each carriage icon 241, the user can select the corresponding carriage icon 241 according to the carriage in use. When the user has multiple carriages, there is no need for the user to re-pair the tire pressure sensors 402 on the tires of each carriage with the second communication module 200 every time a different carriage is used. This enables the matching use of the tires of the corresponding carriage with the second tire icons 24, saving time and facilitating user use.

In one embodiment, in the tire pressure management menu interface, one of the carriage icons 241 is displayed. The tire pressure management menu interface further includes a switching indicator 27. The switching indicator 27 is located on the carriage body icon 23 or adjacent to the carriage body icon 23. The switching indicator 27 is configured to display the carriage touch indicator 28 corresponding to the current carriage icon 23. When the user touches the switching indicator 27, the display screen switches to display another carriage icon 241. That is, in the tire pressure management menu interface, multiple carriage icons 241 will not be displayed simultaneously. The user can switch to view different carriage icons 241 through the switching indicator 27, so as to check the tire pressures of the tires of different carriages.

Certainly, in other embodiments, in the tire pressure management menu interface, multiple carriage icons 241 can be displayed simultaneously, and the manufacturer can customize the configuration according to requirements.

In one embodiment, in the interface where the tire pressure data 505 and the image data are displayed simultaneously, the display screen 2 displays the corresponding carriage touch indicators 28 on the carriage body icon 23 or beside the carriage body icon 23. This enables the user to know which second tire icons 24 on which carriage body icon the current tire pressure data 505 represents. It realizes the state where the user can simultaneously activate multiple carriage icons 241 for use, so as to enable the user to adapt the device for use with motor vehicles having multiple carriages, and to help the user understand the status of the corresponding tires.

In one embodiment, when the carriage icon 241 is activated for use, the corresponding carriage touch indicator 28 is distinct from the carriage touch indicator 28 corresponding to the carriage icon 241 that has not been activated for use. This enables the user to configure and use the corresponding carriage icon 241 for different carriages.

In one embodiment, five first tire icons 25 are respectively distributed on both sides of the vehicle body icon 26. Specifically, one of the first tire icons 25 is distributed at one end adjacent to the vehicle body icon and away from the carriage icon 241, and the remaining four first tire icons 25 are arranged in two rows and two columns. Three second tire icons 23 are arranged in sequence and respectively distributed on both sides of the carriage body icon 23, so that the utility model can be adapted for use with a variety of different motor vehicles. Of course, in other embodiments, according to requirements, the user or the manufacturer can customize and configure the required number of first tire icons 25 and second tire icons 24 for use.

In the tire pressure menu interface, a plurality of first tire icons 25 and second tire icons 24 are distributed. Among some of the first tire icons 25 and second tire icons 24 that are not paired with the tire pressure sensors for use, they can be made distinct from the first tire icons 25 and second tire icons 24 that are paired with the tire pressure sensors 402 for use. This is to enable the user to bind the first tire icons 25 and the second tire icons 24 to the tires for use, that is, to enable the user to monitor the tires corresponding to the first tire icons 25 and the second tire icons 24.

In the above embodiments, the first tire icons 25 and the second tire icons 24 displayed on the simulated vehicle model image 20 are all those that are bound to and used with the tire pressure sensors. The first tire icons 25 and the second tire icons 24 that are not bound to and used with the tire pressure sensors 402 are displayed. Of course, in other embodiments, in the initial state of the display screen 2, all the first tire icons 25 and the second tire icons 24 are displayed, and the first tire icons 25 and the second tire icons 24 that are not bound to and used with the tire pressure sensors 402 are not hidden. However, the first tire icons 25 and the second tire icons 24 that are bound to and used with the tire pressure sensors 402 and the first tire icons 25 and the second tire icons 24 that are not bound to and used with the tire pressure sensors 402 can be distinguished by colors or patterns. Moreover, the first tire icons 25 and the second tire icons 24 that are cyclically displayed every first preset time are all those that are bound to and used with the tire pressure sensors 402.

Figure 28:
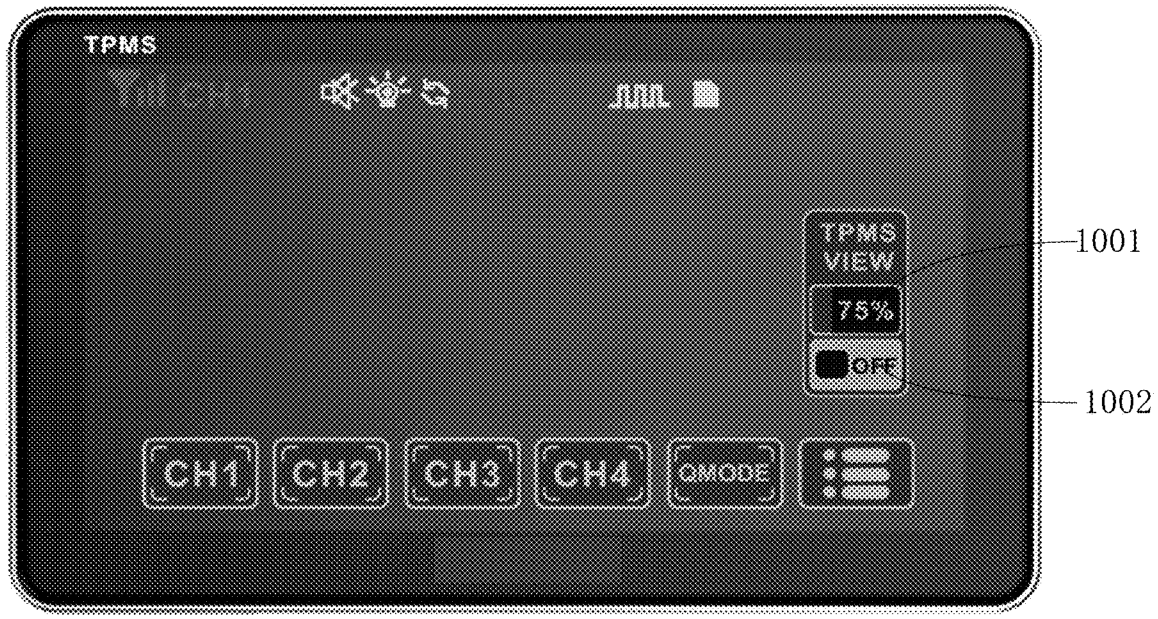
FIG. 28 is a schematic diagram of the display screen of the vehicle-mounted monitoring device of the present invention while displaying a transparency touch key and a transparency switch touch key.

Reference to FIG. 28, in one embodiment, in the interface where the tire pressure data 505 and the image data are displayed simultaneously, the display screen 2 also displays a transparency percentage 1001. When the user touches the transparency percentage 1001, the display screen 2 adjusts the transparency of the tire pressure data 505 and the simulated vehicle model image 20, so as to prevent affecting the display of the images captured by the camera 401, and to enable the user to clearly observe the images captured by the camera 401.

In one embodiment, the display screen 2 also displays an ON/OFF switch 1002. When the user touches the ON/OFF switch 1002, the display screen 2 overlays the tire pressure data 505 and the simulated vehicle model image 20 on the image, or turns off the overlay of the tire pressure data 505 and the simulated vehicle model image 20 on the image, so as to prevent the tire pressure data 505 and the simulated vehicle model image 20 from blocking the images captured by the camera 401.

Based on any of the above-mentioned embodiments of the vehicle-mounted monitoring device 10, this embodiment also provides a vehicle-mounted monitoring system.

Figure 6:
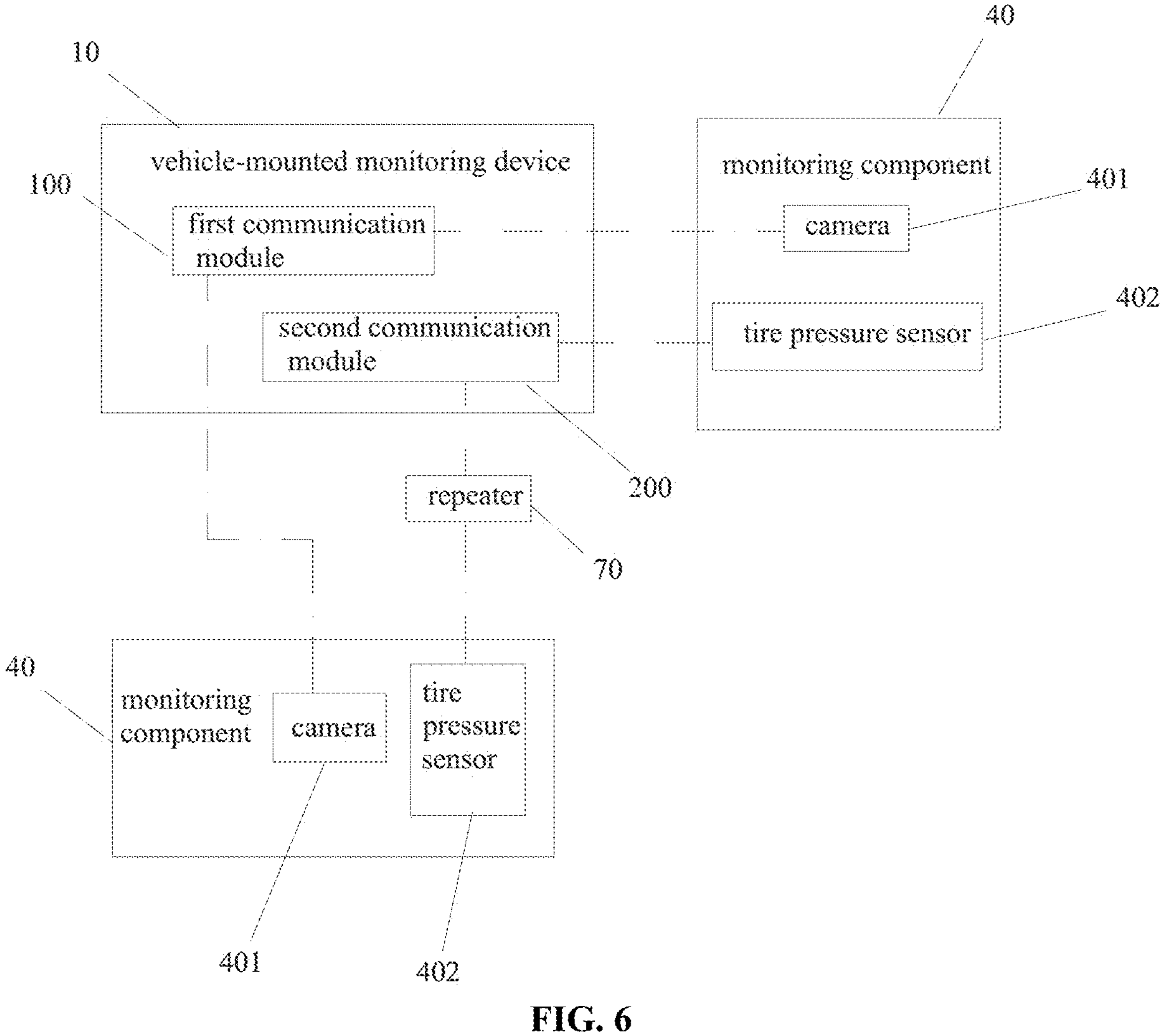
FIG. 6 is a principle block diagram of the vehicle-mounted monitoring system.
Figure 7:
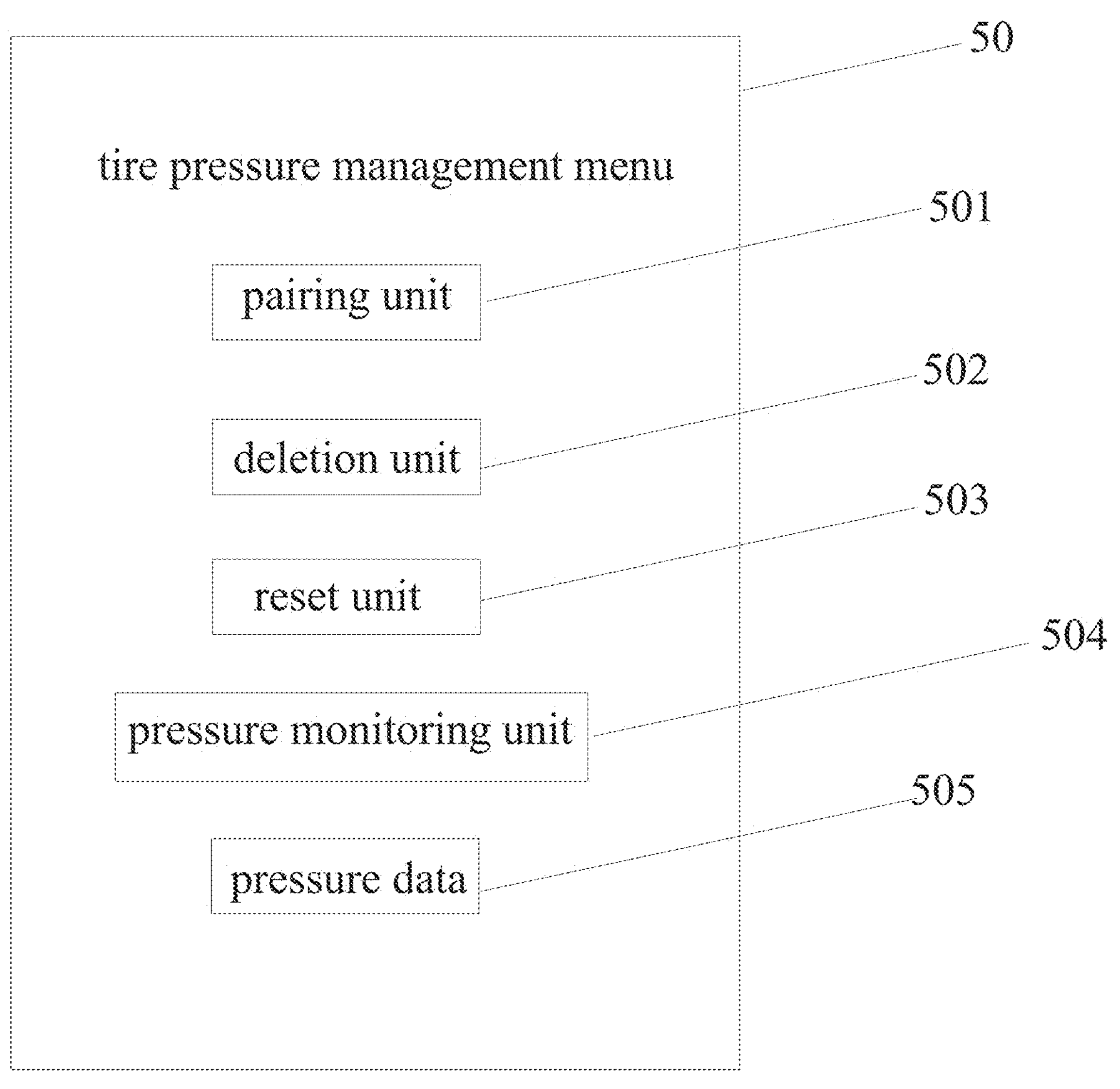
FIG. 7 is a module diagram of a tire pressure management menu in the vehicle-mounted monitoring system.
Figure 8:
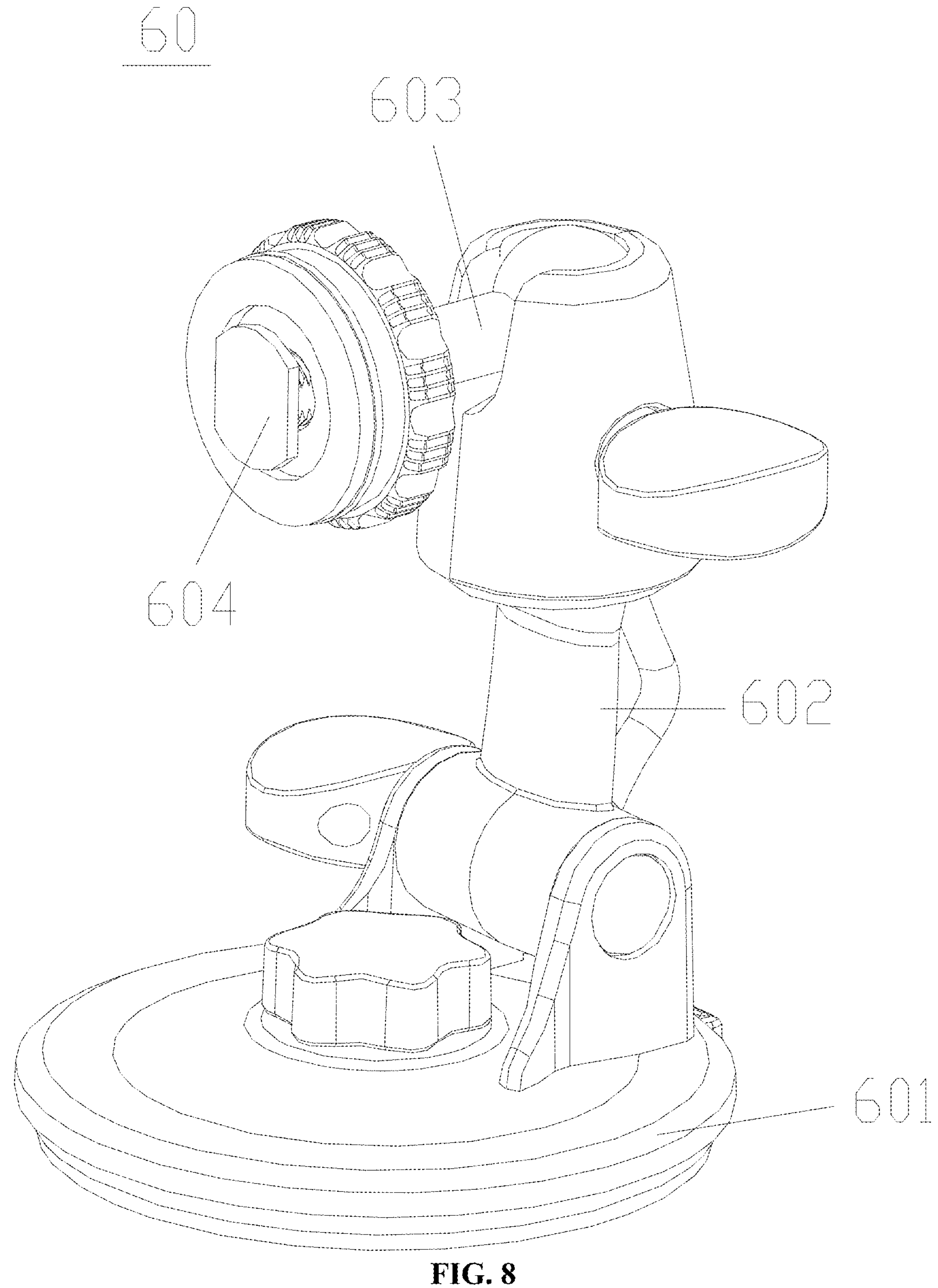
FIG. 8 is a schematic diagram of a vehicle mount of the present invention.

Referring to FIG. 6, the vehicle-mounted monitoring system includes at least one monitoring component 40 and the vehicle-mounted monitoring device 10 as disclosed above. Each monitoring component 40 is configured to in conjunction with a vehicle, and each monitoring component 40 includes the camera 401 wirelessly connected to the first communication module 100 for monitoring, and the tire pressure sensor 402 wirelessly connected to the second communication module 200 for collecting tire pressure data 505. The first communication module 100 receives image data wirelessly transmitted from the camera 401 and transmits the image data to the circuit board 4. The second communication module 200 receives tire pressure data 505 wirelessly transmitted from the tire pressure sensor 402 and transmits the tire pressure data 505 to the circuit board 4, the circuit board 4 then transmits both the image data and the tire pressure data 505 to the display screen 2 for display. Thus enabling the single vehicle-mounted monitoring device 10 to receive image signals from the camera 401 and tire pressure data 505 from the tire pressure sensor 402, obviating the necessity of monitoring multiple display screens and enhancing the driver's visibility and road safety.

Specifically, in one embodiment, the monitoring component 40 can be single, and one monitoring component 40 being suitable for use in a single vehicle.

In other embodiments, there may be multiple monitoring components 40, such as two, three, four, etc. When multiple monitoring components 40 are installed in a single vehicle or distributed across several trailers, this allows a single vehicle-mounted monitoring device 10 to be configured in conjunction with the monitoring components 40 on multiple vehicles. This is convenient for individuals owning multiple vehicles, as they can simply place the vehicle-mounted monitoring device 10 in the corresponding vehicle for use. Alternatively, it is suitable for a single vehicle head used with multiple trailers. By placing the vehicle-mounted monitoring device 10 in the vehicle head, tire pressure monitoring and video surveillance for multiple trailers can be achieved, broadening the range of applications and overcoming the limitation of using one vehicle-mounted monitoring device 10 with only a single monitoring component 40.

In one embodiment, the tire pressure management menu also includes multiple tire pressure monitoring units 504. Each tire pressure monitoring unit 504 corresponds to the tire pressure sensor 402 within a group of monitoring components 40. The touch display screen based on the user's touch interaction with the trailer tire pressure monitoring unit 504 displays the tire pressure data 505 from a tire pressure sensor 402 in the corresponding monitoring component 40, enabling the user to view the tire pressure data 505 of the corresponding vehicle or trailer by interacting with the respective tire pressure monitoring unit 504 on the touch display screen when using the specific vehicle.

Specifically, in practical application, when a user clicks on the tire pressure monitoring menu TPMS on the display screen 2, they enter the interface of the tire pressure management menu, as shown in FIG. 24. In FIG. 24, a gray and white box is configured to display the tire pressure values detected by the corresponding tire pressure sensor 402, as well as the tire pressure alarm values. T1, T2, and T3 in the FIG. 24 are tire pressure monitoring units 504. By selecting T1, T2, or T3, users can switch the tire pressure monitoring for different trailers. When a user clicks on the corresponding gray and white box, information about the tire pressure sensor 402, settings for the tire pressure alarm value, the pairing unit 501 for the tire pressure sensor 402, the deletion unit 502, and the reset unit 503, etc., will pop up below, as shown in FIG. 25.

In one embodiment, the vehicle-mounted monitoring system also includes a repeater 70. The repeater 70 is configured to transmit the received tire pressure data 505 to the vehicle-mounted monitoring device 10. When the vehicle is relatively long, and the tire pressure sensors 402 far from the vehicle-mounted monitoring device 10 have weak wireless transmission signals, the repeater 70 can be positioned in between. The repeater 70 receives the tire pressure data 505 and transmits the tire pressure data 505 to the vehicle-mounted monitoring device 10, allowing the vehicle-mounted monitoring system of this embodiment to be suitable for use in longer vehicles, achieving the transmission of tire pressure data 505 over longer distances.

Referring to FIG. 2 to FIG. 4 and FIG. 8, in one embodiment, the vehicle-mounted monitoring system also includes a vehicle mount 60. A bottom of the vehicle mount 60 is fixed to the vehicle's central control console via suction cups or adhesive. A back of the vehicle-mounted monitoring device 10 is provided with a slide groove 14, and the vehicle mount 60 is provided with a slider 604. The vehicle-mounted monitoring device 10 is secured to the vehicle mount 60 by placing the slider 604 into the slide groove 14. Thus, the vehicle-mounted monitoring device 10 can be fixed in positions such as the vehicle's central control console via the vehicle mount 60.

Specifically, a back of the rear shell 12 is provided with a first recess 121 with an open bottom and a second recess 122 located on both sides of the first recess 121. The main body 1 also includes a panel 13, the panel 13 is located on the second recess 122. The panel 13 is provided with an opening 131 with an open bottom at a position corresponding to the first recess 121, and width of the opening 131 is smaller than width of the first recess 121. The slide groove 14 is formed by the surrounding structure of the panel 13 and the first recess 121.

In one embodiment, the vehicle mount 60 includes a suction cup base 601, a first rotating rod 602 rotatably disposed on the suction cup base 601, and a second rotating rod 603 rotatably connected to the first rotating rod 602 via a universal ball head. The slider 604 is located at an end of the second rotating rod 603 far from the first rotating rod 602. The suction cup base 601 is a structure commonly found on existing vehicle-mounted phone holders and is a known technology. The suction cup base can be affixed to places like the vehicle's central control console using a suction cup. The first 602 and the second 603 rotating rods allow adjustment of height and angle of the vehicle-mounted monitoring device 10 for user convenience.

Figure 9:
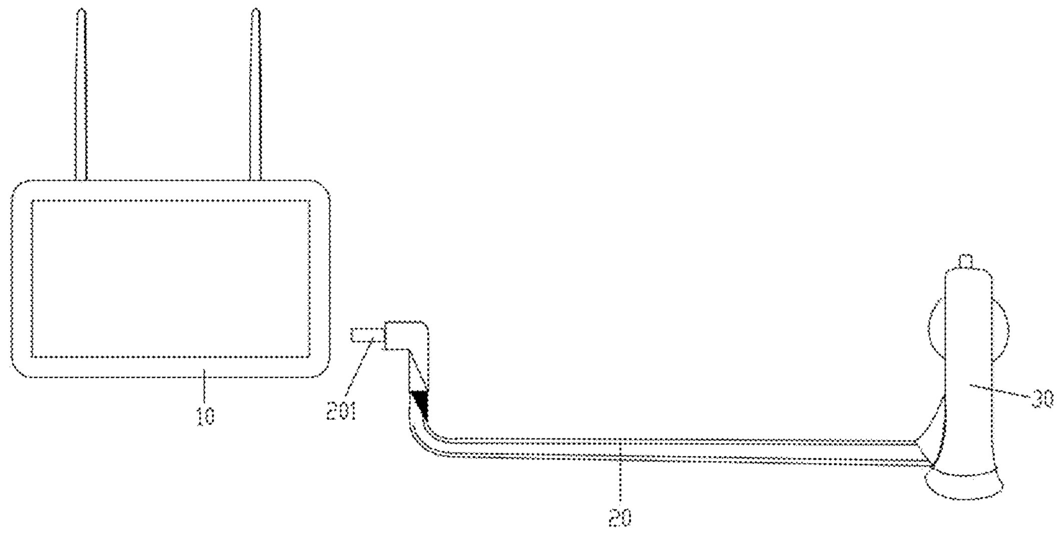
FIG. 9 is a breakdown diagram of the vehicle-mounted monitoring device and a first connection line.

In one embodiment, referring to FIG. 9, the vehicle-mounted monitoring system also includes a cigarette lighter 30 for use with a vehicle's cigarette lighter socket and a first connection cable 20 electrically connected to the cigarette lighter 30. The first connection cable 20 is provided with a male power plug 201 at an end far from the cigarette lighter 30. The main body 1 is provided with a female power plug 41 electrically connected to the circuit board 4 and configured to mate with the male power plug 201. The cigarette lighter 30 draws power from the vehicle's cigarette lighter socket and transmits the power to the circuit board 4 and the display screen 2 through the first connection cable 20, enabling the device to be powered from the vehicle. In another embodiment, the vehicle-mounted monitoring device 10 can also be powered through a USB interface power cable, etc.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of “first”, “second”, etc. in the present invention are only used for descriptive purposes, and cannot be understood as indicating or implying its relative importance or implicitly indicating the number of technical features indicated. Therefore, features defined by “first” and “second” can explicitly instruct or impliedly include at least one feature. In addition, “and/or” in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:

1. A vehicle-mounted monitoring system, comprising at least one camera for monitoring;

at least one tire pressure sensor for detecting tire pressure data;

and a vehicle-mounted monitoring device detachably arranged on the vehicle, wherein the vehicle-mounted monitoring device is provided with a circuit board, a display screen, a first communication module and a second communication module, and the display screen, the first communication module and the second communication module are all electrically connected to the circuit board;

the first communication module wirelessly communicates with the cameras and is configured to receive an image data wirelessly transmitted by each camera and then transmit the image data to the circuit board, and the second communication module wirelessly communicates with the tire pressure sensors and is configured to receive the tire pressure data wirelessly transmitted by each tire pressure sensor in real time and then transmit the tire pressure data to the circuit board; the circuit board is configured to transmit the image data and the tire pressure data to the display screen, and the display screen displays the image data and the tire pressure data simultaneously, wherein the display screen directly displays an abnormal tire pressure data when the tire pressure data is abnormal, and the display screen displays a tire pressure alarm indication when the tire pressure data is abnormal; the abnormality in the tire pressure data comprises: the tire pressure is higher than a first preset value, tire temperature is higher than a preset temperature, the tire pressure is lower than a second preset value, the tire pressure drops by a third preset value within a second preset time, the tire pressure drops by a fourth preset value within a third preset time, and the tire pressure sensor signal is lost, wherein the second preset time is less than the third preset time, the tire pressure dropping by the third preset value within the second preset time indicates a first deflation of the tire, and the tire pressure dropping by the fourth preset value within the third preset time indicates a second deflation of the tire, and the first deflation of the tire and the second deflation of the tire have different deflation speeds;

wherein the second preset time is less than the third preset time, the tire pressure dropping by the third preset value within the second preset time indicates a first deflation of the tire; and wherein the circuit board drives the display screen to display a tire blowout image or a tire blowout indicator when the tire pressure changes from a normal pressure value to below the third preset value within a preset time period, and the tire blowout image is either the real-time image of the tire captured by the camera or a virtual dynamic image of the tire blowout.

2. The vehicle-mounted monitoring system according to claim 1, wherein the display screen is divided into multiple display areas under the drive of the circuit board, at least one of the display areas is configured to display the image data, and at least one of the display areas is configured to display the tire pressure data.

3. The vehicle-mounted monitoring system according to claim 1, wherein the number of the tire pressure sensors is multiple, the display screen is configured to display one of the tire pressure data superimposed on the image data; the display screen is also configured to change to display the tire pressure data collected by another tire pressure sensor at intervals of a first preset time.

4. The vehicle-mounted monitoring system according to claim 3, wherein the abnormality in the tire pressure data further comprises: the tire pressure dropping by the fourth preset value within the third preset time indicates a second deflation of the tire, and the first deflation of the tire and the second deflation of the tire have different deflation speeds.

5. The vehicle-mounted monitoring system according to claim 4, wherein when there are multiple abnormal tire pressure data, the display screen displays one of the multiple abnormal tire pressure data in rotation at the first preset time interval based on an entry time of the abnormal tire pressure data, wherein the tire pressure alarm indication is one or more of the following: a tire pressure alarm icon, a real-time tire imagery, and an abnormal tire virtual imagery; the real-time tire imagery is the real-time image of the abnormal tire captured by the camera, and the abnormal tire virtual imagery comprises virtual image data pre-stored in the circuit board; the virtual image data comprises dynamic imagery data for excessively high tire pressure, excessively low tire pressure, and tire turning color, or a combination thereof.

6. The vehicle-mounted monitoring system according to claim 4, wherein further comprises an alarm unit arranged in a main body and electrically connected to the circuit board, the circuit board driving the alarm unit to alert when the tire pressure data is abnormal; the alarm unit being one or more of a horn, a buzzer, or an alarm light.

7. The vehicle-mounted monitoring system according to claim 3, wherein the circuit board displays a simulated vehicle model image through the display screen; the simulated vehicle model image comprises a vehicle shape icon, and the vehicle shape icon comprises a vehicle body icon and multiple first tire icons located on or beside the vehicle body icon; each of the first tire icons corresponds to one of the tire pressure sensors, and a position of each first tire icon on the vehicle body icon corresponds to a position of a motor vehicle tire on the motor vehicle; the first tire icon flashes or is displayed differently from other first tire icons when the display screen displays the tire pressure data collected by a corresponding tire pressure sensor, and the tire pressure data is located on the vehicle shape icon or beside the vehicle shape icon.

8. The vehicle-mounted monitoring system according to claim 7, wherein the tire pressure data comprises one or more of the following: tire pressure, tire temperature and battery power information of the tire pressure sensor; the circuit board transmits the tire air pressure and tire temperature to the display screen to be displayed, and the display screen turns color of the first tire icon corresponding to the tire pressure data to red when the tire pressure data is abnormal, and wherein the display screen is a touch display screen; the display screen displays a tire pressure management menu interface when it is based on the simulated vehicle model image on the touch display screen; the tire pressure management menu interface comprises an enlarged simulated vehicle model image; in the tire pressure management menu interface, at least one of the tire air pressure and the tire temperature is displayed on the first tire icon or beside the first tire icon corresponding to the tire pressure sensor.

9. The vehicle-mounted monitoring system according to claim 8, wherein in the tire pressure management menu interface, the display screen displays a tire pressure setting interface corresponding to the first tire icon when the user touches the first tire icon; the tire pressure setting interface comprises a high-pressure alarm value, a low-pressure alarm value, a temperature alarm value and a keyboard; when the user touches one of the high-pressure alarm value, the low-pressure alarm value and the temperature alarm value, the display screen allows the user to set the corresponding high-pressure alarm value, low-pressure alarm value and temperature alarm value through the characters on the touch keyboard.

10. The vehicle-mounted monitoring system according to claim 9, wherein the tire pressure setting interface further comprises a pairing unit, and the pairing unit comprises automatic pairing and manual pairing; the display screen automatically pairs and communicates the second communication module with the tire pressure sensor when the user touches the automatic pairing and at the same time the tire pressure sensor is assembled onto a tire; the display screen pairs the tire pressure sensor with the second communication module when the user touches the manual pairing and inputs the corresponding tire pressure sensor pairing code through the touch keyboard.

11. The vehicle-mounted monitoring system according to claim 9, wherein the simulated vehicle model image further comprises a carriage icon; the carriage icon comprises a carriage body icon and a second tire icon located on the carriage body icon or beside the carriage body icon; the carriage body icon is positioned behind the vehicle body icon; each the second tire icon is used in correspondence with a tire pressure sensor, and a position of each second tire icon on the carriage body icon corresponds to a position of the motor vehicle tire on the motor vehicle carriage; at least one first tire icon is distributed at one end of the vehicle body icon adjacent to the carriage icon, and/or at least one second tire icon is distributed at one end of the carriage icon away from the vehicle body icon.

12. The vehicle-mounted monitoring system according to claim 11, wherein the number of the carriage icons is multiple, and each of the carriage icons is configured corresponding to a carriage of a motor vehicle respectively; the tire pressure management menu interface further comprises multiple carriage touch indicators, and each of the multiple carriage touch indicators is configured corresponding to a carriage icon respectively; the display screen also starts or stops using the corresponding carriage icon when the user touches the carriage touch indicator.

13. The vehicle-mounted monitoring system according to claim 11, wherein in the tire pressure management menu interface, one of the carriage icons is displayed; the tire pressure management menu interface further comprises a switching indicator, and the switching indicator is located on or beside the carriage icon; the switching indicator is configured to display the carriage touch indicator corresponding to the current carriage icon; the display screen switches to display another carriage icon when the user touches the switching indicator, wherein in the interface where the tire pressure data and the image data are displayed simultaneously, the display screen displays the corresponding carriage touch indicator on the carriage icon or beside the carriage icon, wherein the display screen also enables the overlay of tire pressure data on the image or turns off the overlay of tire pressure data on the image by means of the user's touch on an ON/OFF switch.

14. The vehicle-mounted monitoring system according to claim 9, wherein when the vehicle-mounted monitoring device is in initial state, the display screen displays image captured by one of the cameras, the display screen is a touch screen, by tapping the display screen, a first group of shortcut menus pops up, the first group of shortcut menus comprises a plurality of camera switching channels, a mode menu QMODE, and a main menu identifier, when the user taps the mode menu QMODE, the display screen displays all images from the cameras, wherein when the user taps a main menu list, main menu functions are provided, the main menu functions comprises: sound settings for adjusting camera volume, a pairing unit for camera pairing, a PICTURE unit, a MIRROR unit, the mode menu QMODE, a SETTING icon, a SCAN icon, a parking line switch menu, a RECORD icon, and a PLAY icon.

15. The vehicle-mounted monitoring system according to claim 14, wherein the vehicle-mounted monitoring device is in initial state, when the user taps the display screen again, a second group of shortcut menus is provided, the second group of shortcut menus corresponds to the control of the cameras, and wherein the second group of shortcut menus comprises a parking line switch menu, a sound switch menu for camera, a brightness adjustment menu for display screen, a night light switch menu for camera, a recording switch menu for camera, and a SCAN menu or tire pressure monitoring menu TPMS for switching camera channels.

16. The vehicle-mounted monitoring system according to claim 1, when the second antenna comprises a first FPC antenna or a spring antenna, the second antenna comprises a second FPC antenna, at least part of the second antenna is disposed at a top or near a top of an inner side wall of the main body, wherein the main body comprises a front shell and a rear shell connected to the front shell to form a cavity, the display screen is arranged on the front shell, the circuit board is placed inside the cavity and fixed to the rear shell, the first antenna comprises two antenna units arranged at intervals at a top of the rear shell and each antenna unit is connected to the circuit board through a coaxial line, wherein a top surface of the rear shell is provided with an arc surface, at least part of the second antenna adhering to the arc surface, and the second antenna is connected to the circuit board through a coaxial line.

17. The vehicle-mounted monitoring system according to claim 1, wherein the first communication module comprises a first antenna electrically connected to the circuit board, and the second communication module comprises a second antenna electrically connected to the circuit board, the first antenna is configured to receive the image data wirelessly and transmit the image data to the circuit board, the second antenna is configured to receive the tire pressure data wirelessly and transmit the tire pressure data to the circuit board; and wherein the first communication module is a 2.4G module, and the first antenna is a 2.4G antenna and arranged at a top of the main body, the first antenna is configured to receive 1080P frequency video data, the second communication module is a 433 m wireless module, a transmission frequency of the second antenna is 433 MHz, matching transmission frequency of the tire pressure sensor for receiving tire pressure data.

* * * * *